United States Patent
Takada

(10) Patent No.: US 9,557,542 B2
(45) Date of Patent: Jan. 31, 2017

(54) ZOOM LENS AND IMAGE PICKUP APPARATUS USING THE SAME

(71) Applicant: OLYMPUS CORPORATION, Tokyo (JP)

(72) Inventor: Keisuke Takada, Tokyo (JP)

(73) Assignee: Olympus Corporation, Tokyo (JP)

( * ) Notice: Subject to any disclaimer, the term of this patent is extended or adjusted under 35 U.S.C. 154(b) by 37 days.

(21) Appl. No.: 14/685,213

(22) Filed: Apr. 13, 2015

(65) Prior Publication Data
US 2015/0212304 A1    Jul. 30, 2015

Related U.S. Application Data

(63) Continuation of application No. PCT/JP2013/075241, filed on Sep. 19, 2013.

(30) Foreign Application Priority Data

Oct. 15, 2012 (JP) .................. 2012-228324
Oct. 15, 2012 (JP) .................. 2012-228325

(51) Int. Cl.
*G02B 15/16*   (2006.01)
*G02B 15/173*  (2006.01)
(Continued)

(52) U.S. Cl.
CPC .................. *G02B 15/16* (2013.01); *G02B 9/64* (2013.01); *G02B 13/009* (2013.01);
(Continued)

(58) Field of Classification Search
CPC ......... G02B 15/16; G02B 13/009; G02B 9/64; G02B 13/0045; G02B 15/173; G02B 13/18; G02B 9/34; G02B 15/14
See application file for complete search history.

(56) References Cited

U.S. PATENT DOCUMENTS 6,449,433 B2 * 9/2002 Hagimori ............. G02B 15/173
                                                  348/342
7,423,813 B2    9/2008 Kamo
(Continued)

FOREIGN PATENT DOCUMENTS

JP        3598971       9/2004
JP     2007-279351     10/2007
(Continued)

OTHER PUBLICATIONS

International Search Report, dated Dec. 24, 2013, issued in corresponding International Application No. PCT/JP2013/075241.
(Continued)

*Primary Examiner* — Joseph P Martinez
(74) *Attorney, Agent, or Firm* — Andrews Kurth Kenyon LLP

(57) ABSTRACT

A zoom lens includes in order from an object side to an image side, a first lens unit having a positive refractive power, a second lens unit having a negative refractive power, a third lens unit having a positive refractive power, and a fourth lens unit having a negative refractive power, and the fourth lens unit includes at least two lenses. At the time of zooming from a wide angle end to a telephoto end, a distance between the first lens unit and the second lens unit widens, a distance between the second lens unit and the third lens unit narrows, a distance between the third lens unit and the fourth lens unit fluctuates, and the first lens unit, after moving toward the image side, moves toward the object side.

19 Claims, 18 Drawing Sheets

(51) Int. Cl.
*G02B 9/64* (2006.01)
*G02B 13/00* (2006.01)
*H04N 5/225* (2006.01)
*H04N 5/232* (2006.01)
*G02B 13/18* (2006.01)

(52) U.S. Cl.
CPC ....... *G02B 13/0045* (2013.01); *G02B 15/173* (2013.01); *H04N 5/2254* (2013.01); *H04N 5/23296* (2013.01); *G02B 13/18* (2013.01)

(56) References Cited

U.S. PATENT DOCUMENTS

| | | |
|---|---|---|
| 7,558,004 B2 | 7/2009 | Ori |
| 7,609,457 B2 | 10/2009 | Iwama |
| 2007/0242367 A1* | 10/2007 | Kamo ................. G02B 15/173 359/683 |

FOREIGN PATENT DOCUMENTS

| | | |
|---|---|---|
| JP | 2007-279622 | 10/2007 |
| JP | 2008-292907 | 12/2008 |
| JP | 2012-068656 | 4/2012 |

OTHER PUBLICATIONS

International Preliminary Report on Patentability, dated Apr. 30, 2015, issued in corresponding International Application No. PCT/JP2013/075241.

* cited by examiner

FIG. 1D

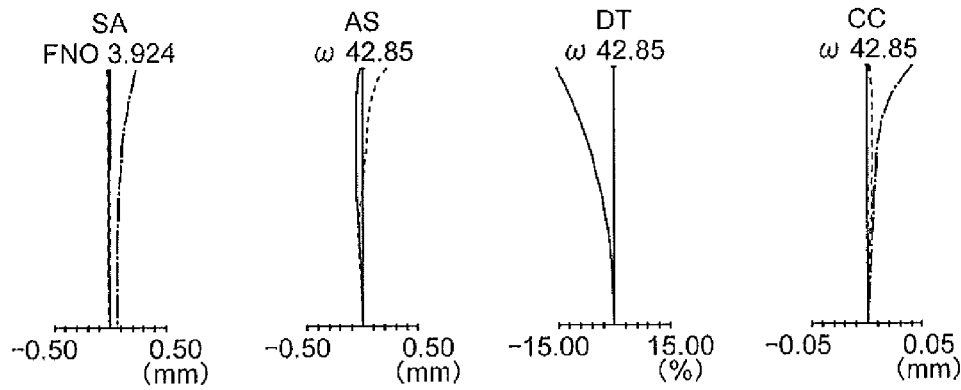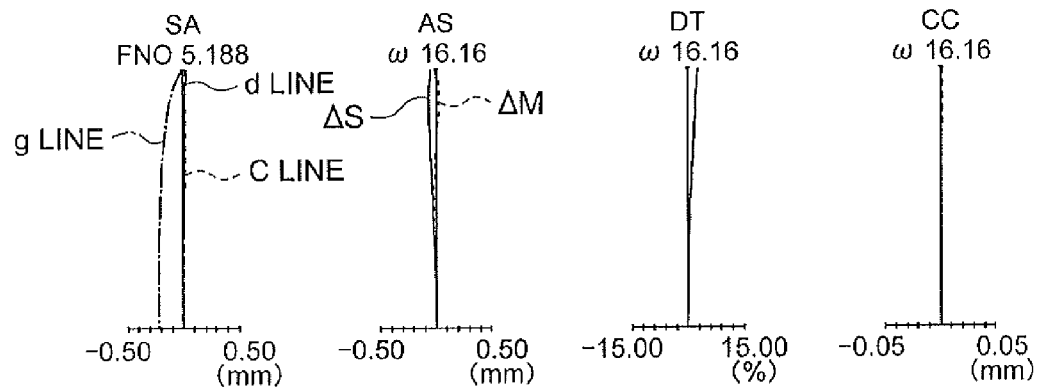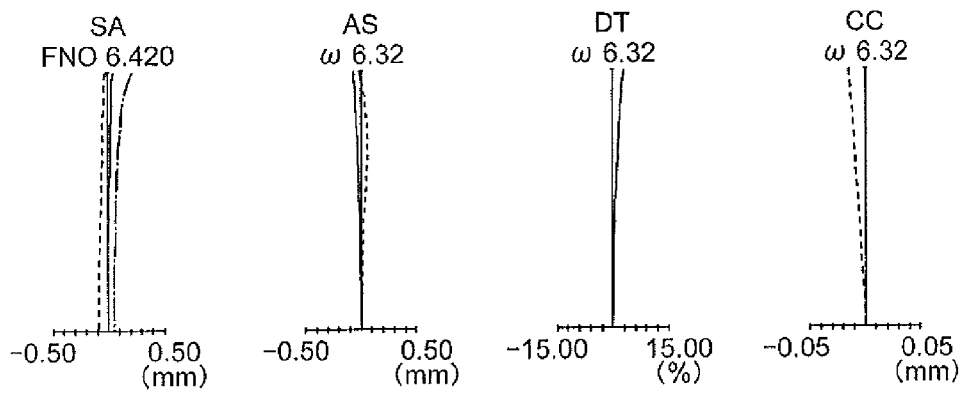

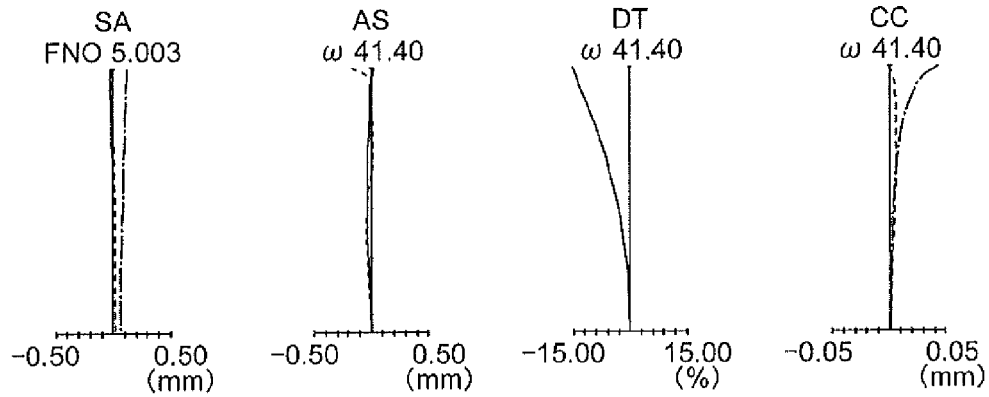
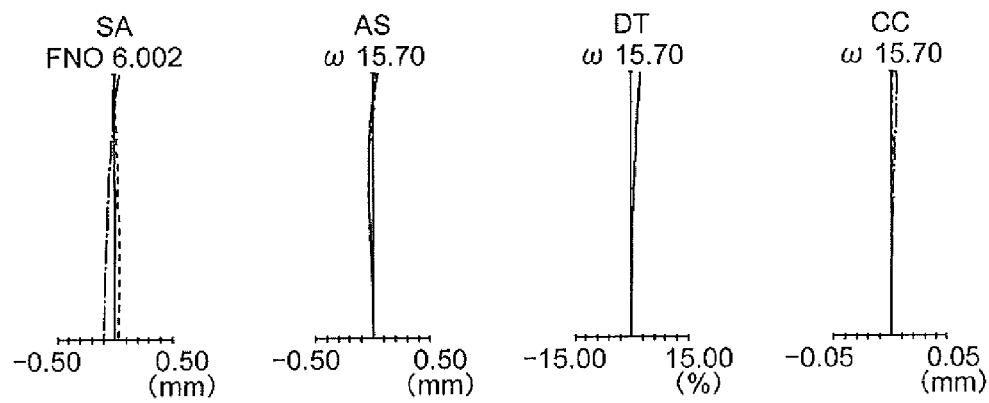
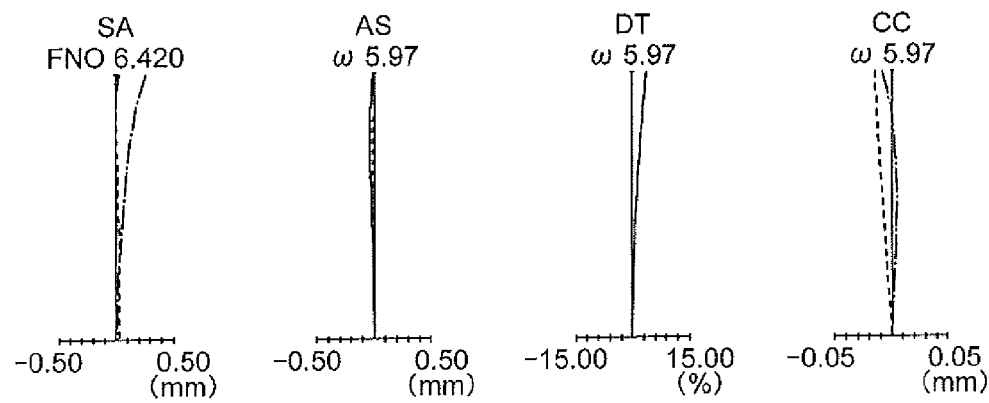

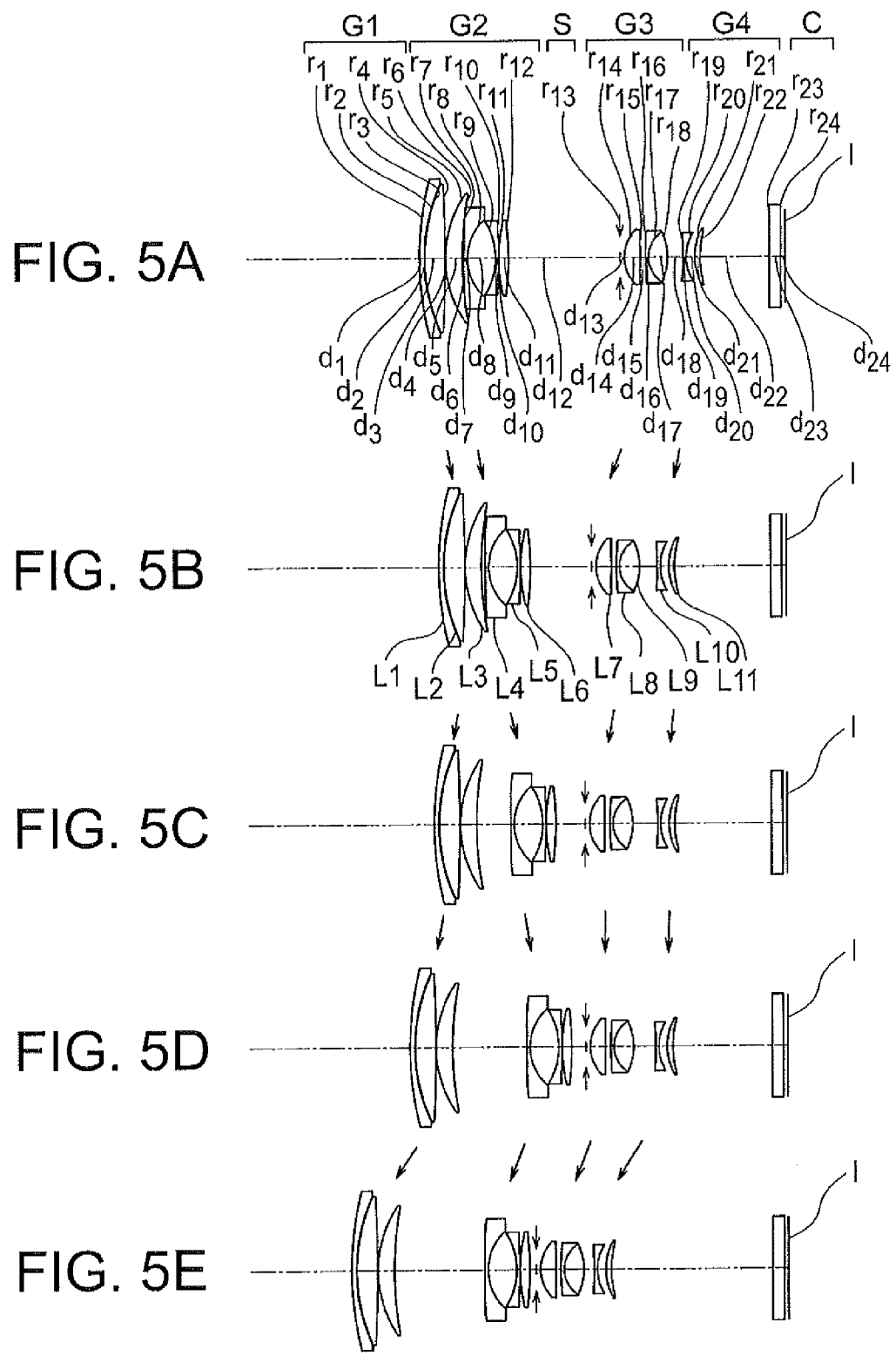

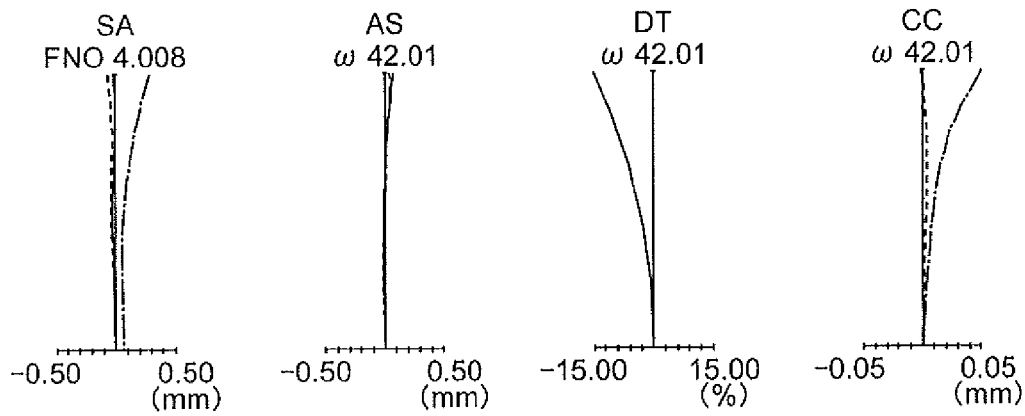
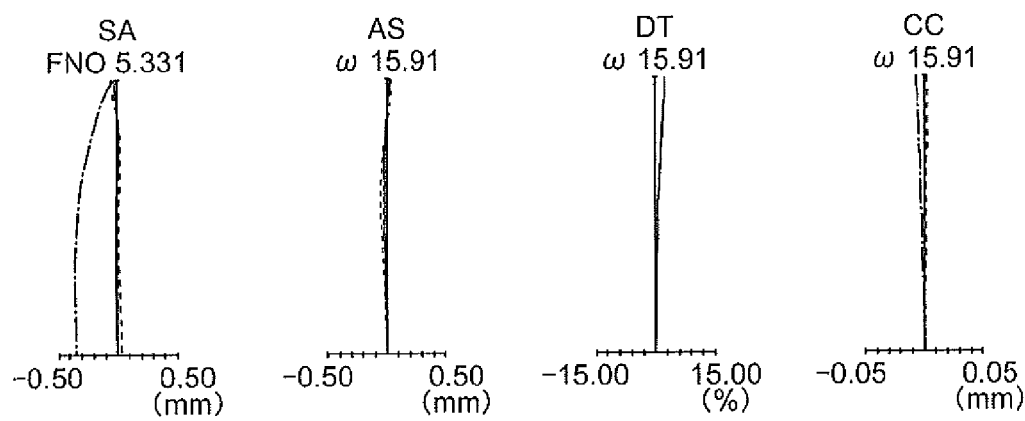
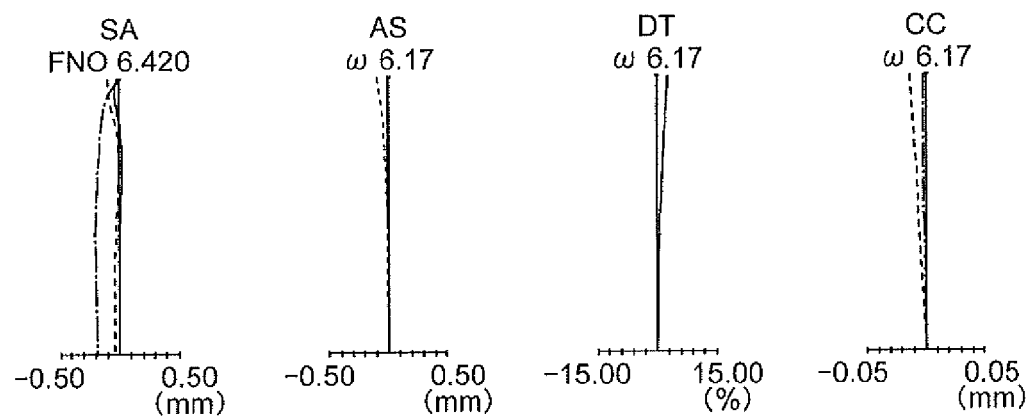

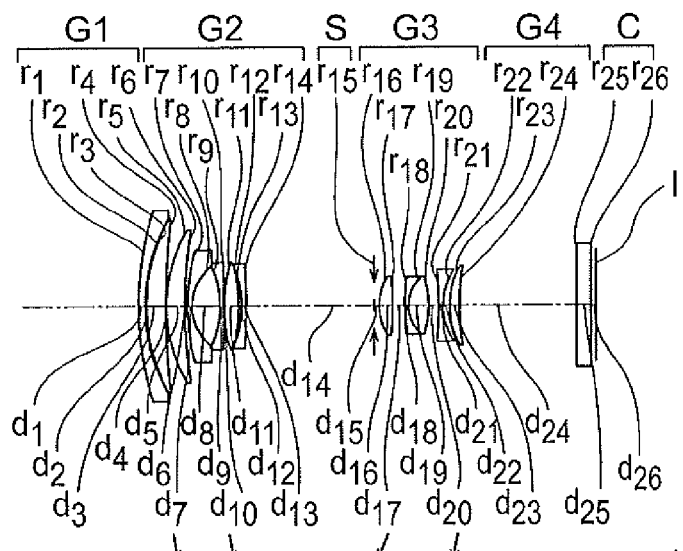
FIG. 7A
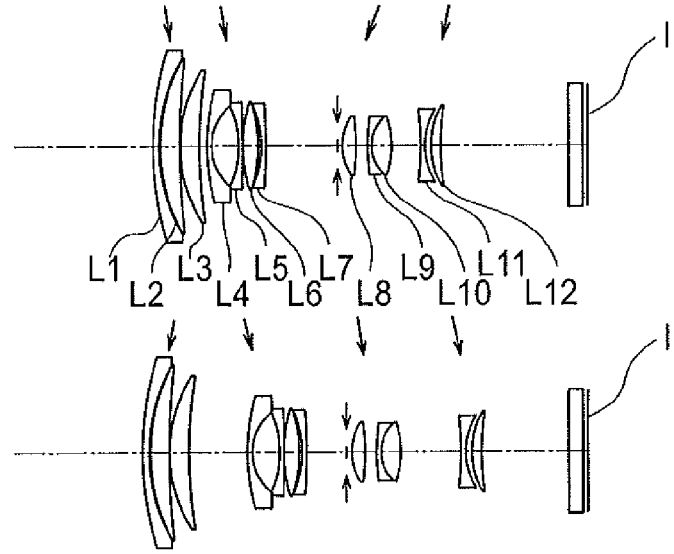
FIG. 7B
FIG. 7C
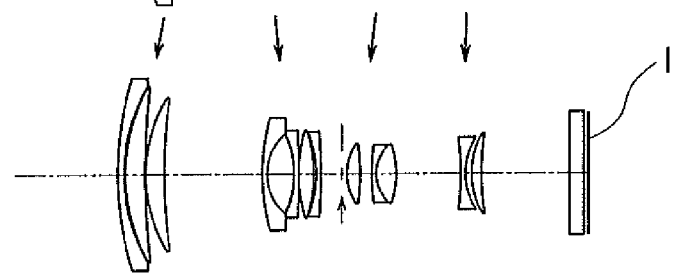
FIG. 7D
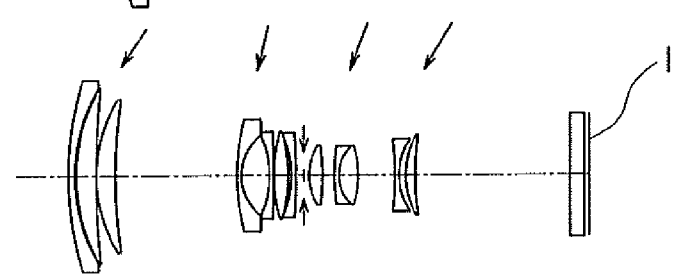
FIG. 7E

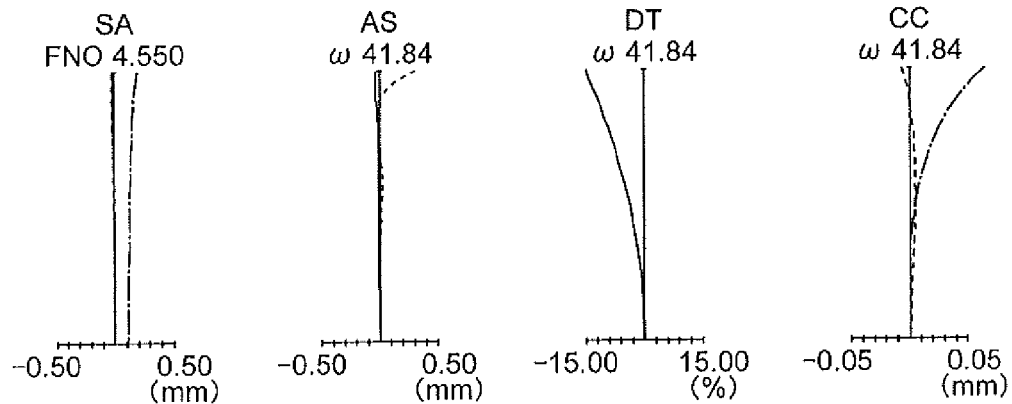
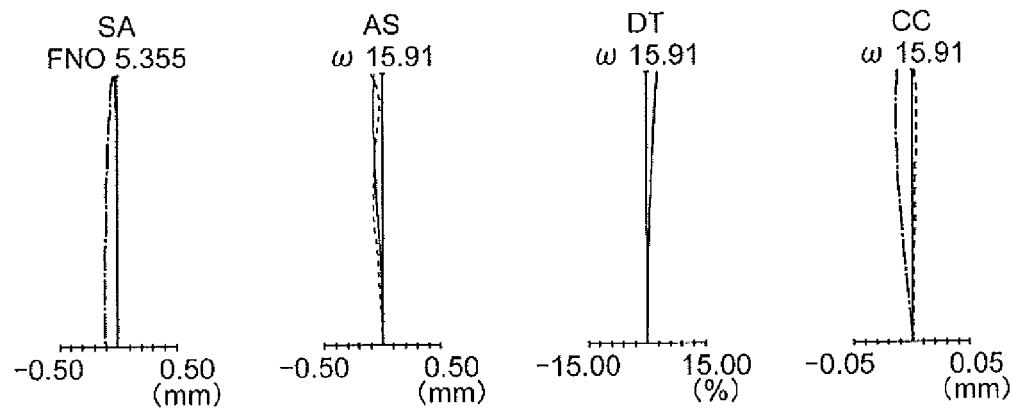
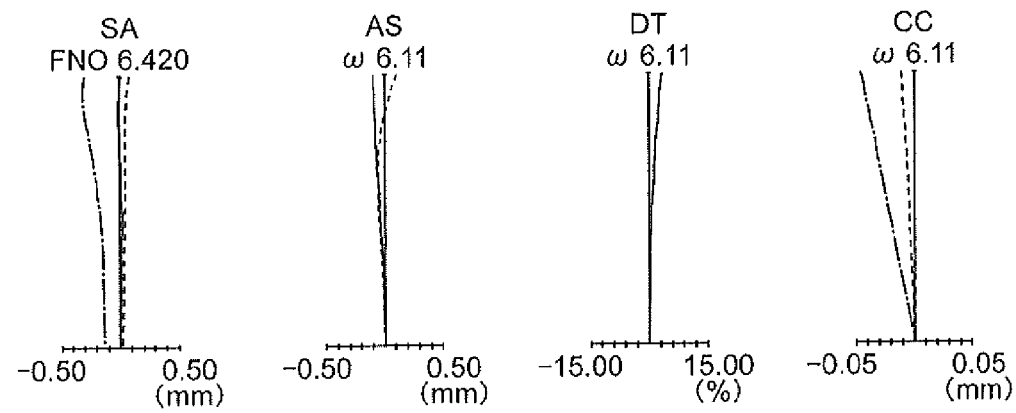

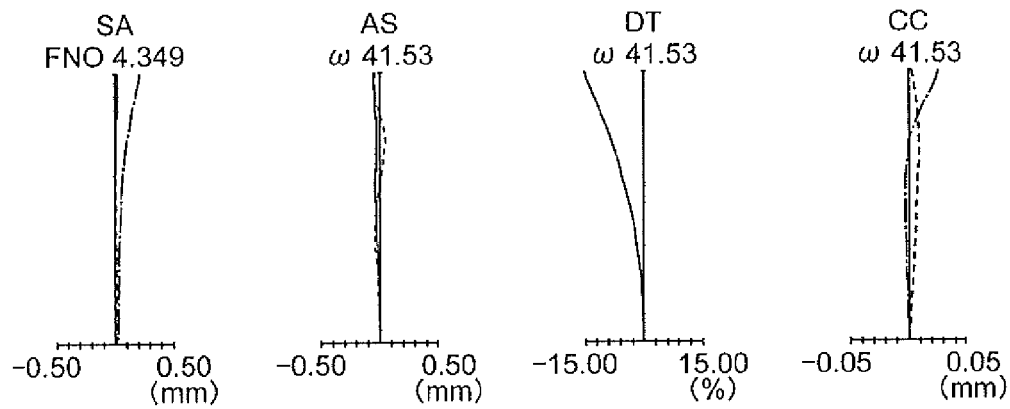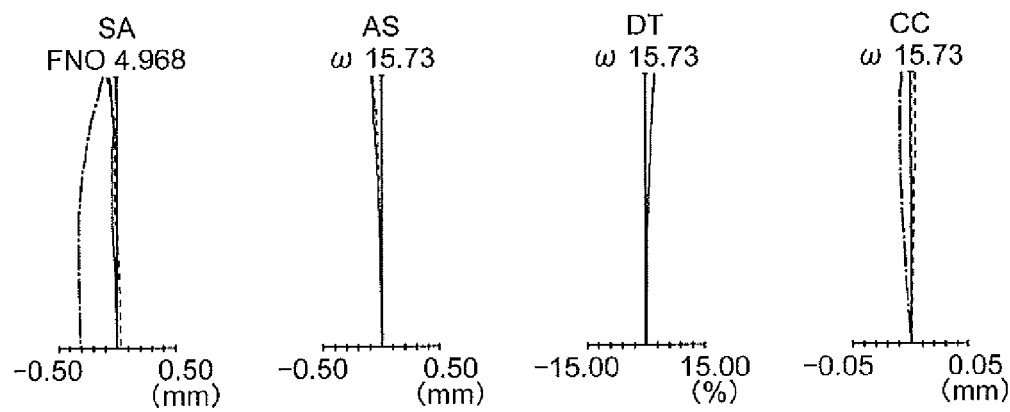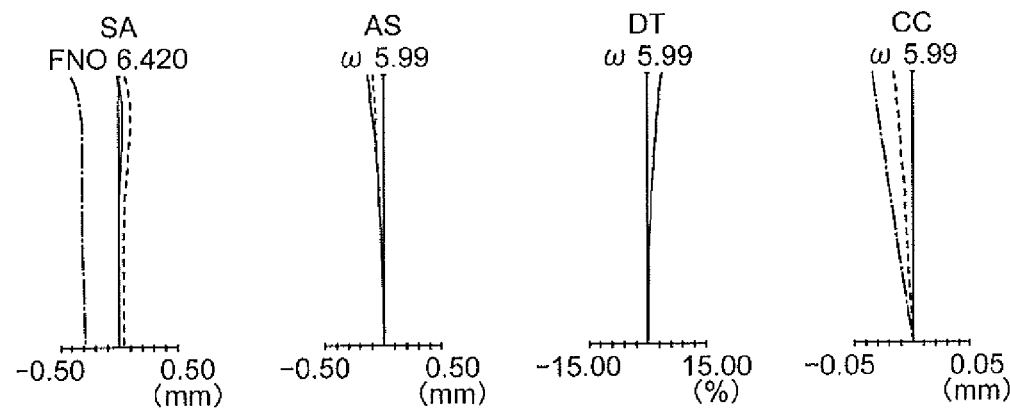

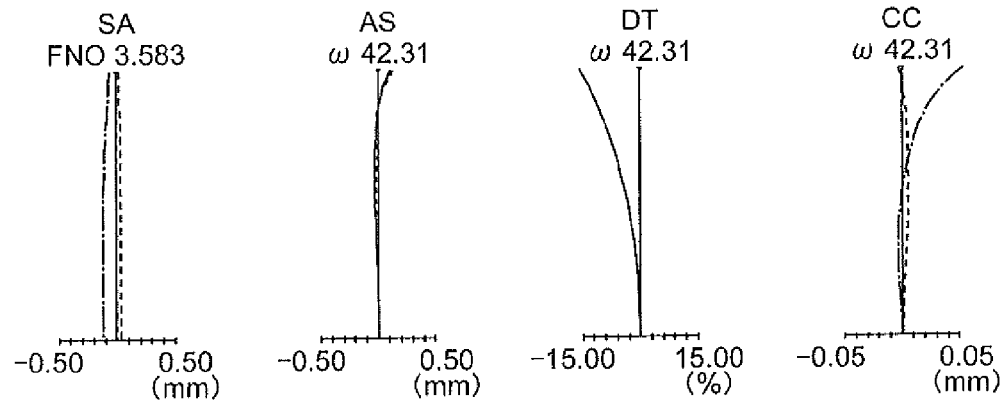
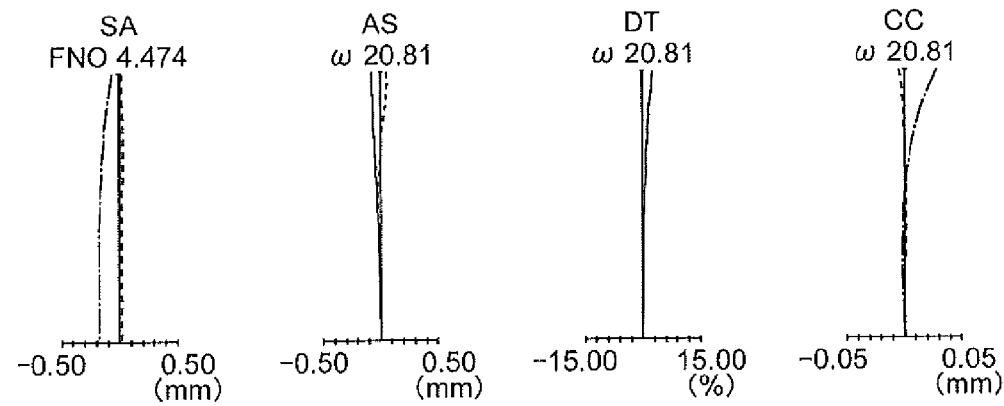
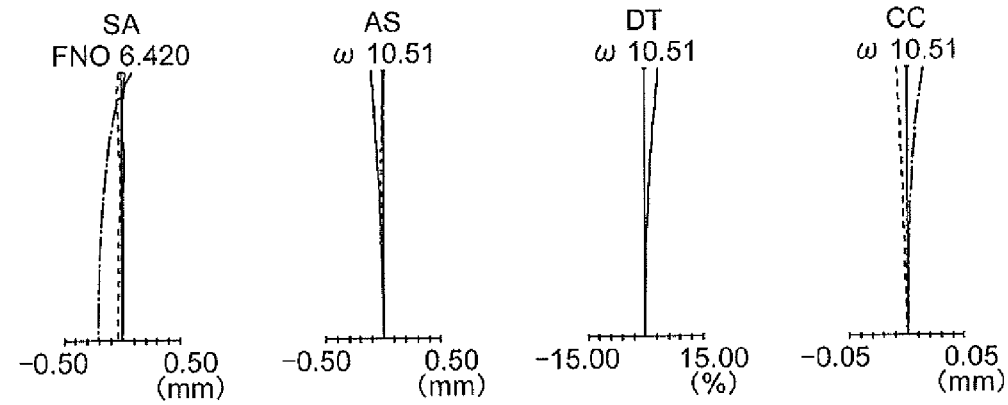

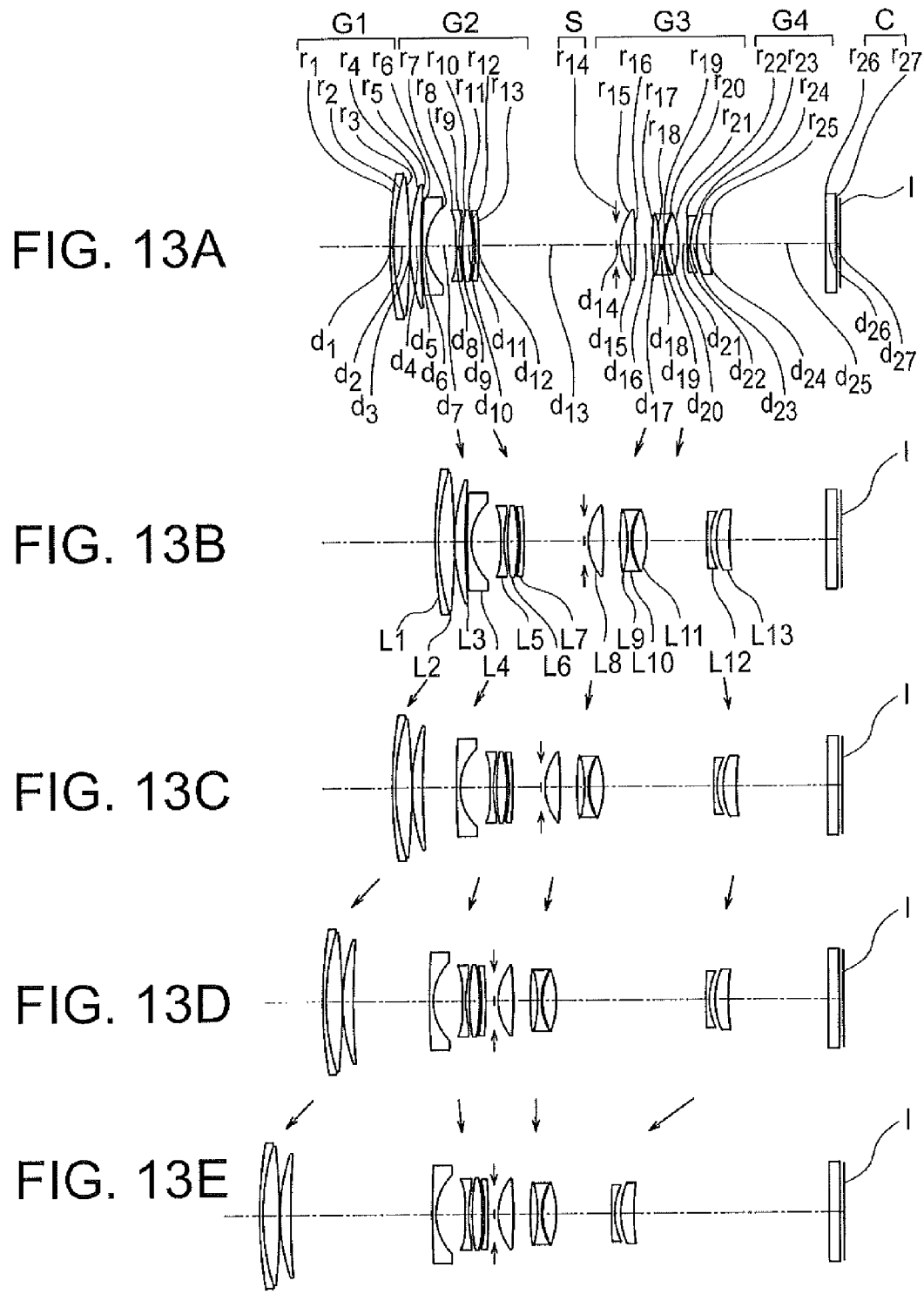

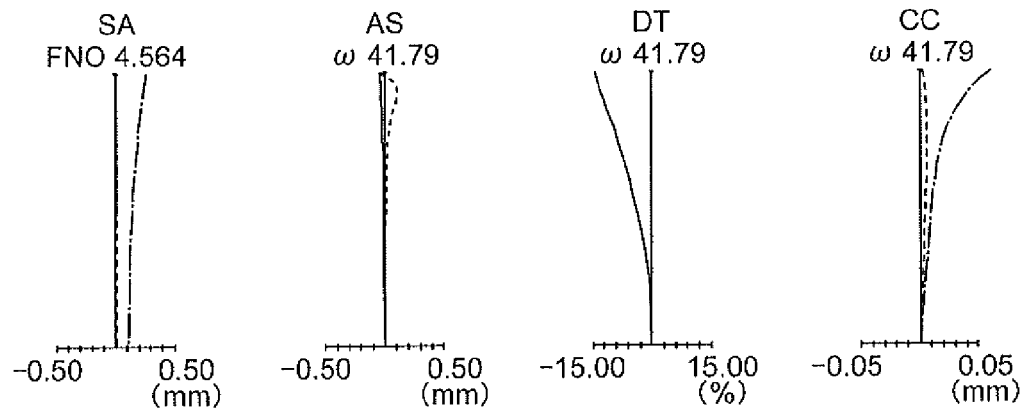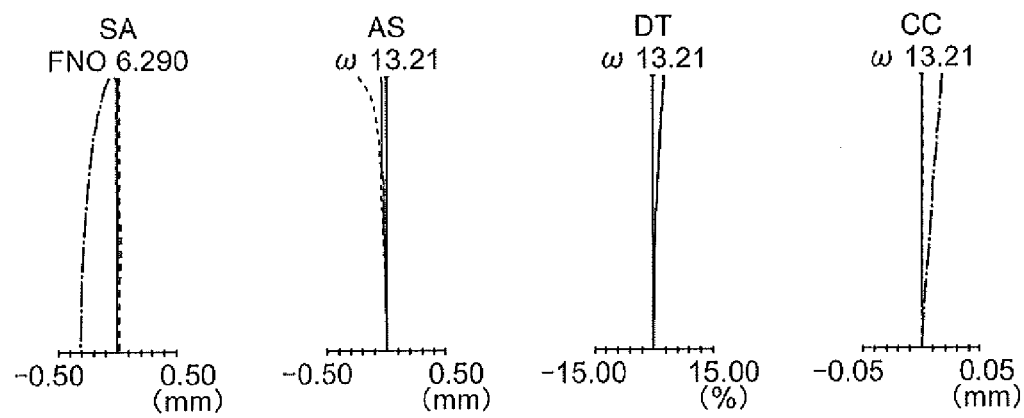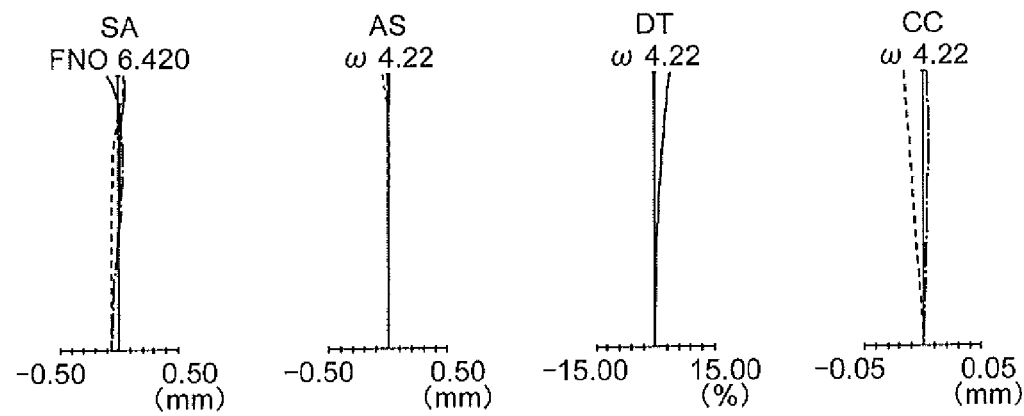

ZOOM LENS AND IMAGE PICKUP APPARATUS USING THE SAME

CROSS-REFERENCE TO RELATED APPLICATION

The present application is a continuation of PCT/JP2013/075241, filed on Sep. 19, 2013 which is based upon and claims the benefit of priority from Japanese Patent Application Nos. 2012-228324 filed on Oct. 15, 2012 and 2012-228325 filed on Oct. 15, 2012; the entire contents of which are incorporated herein by reference.

BACKGROUND OF THE INVENTION

Field of the Invention

The present invention relates to a zoom lens and an image pickup apparatus using the same.

Description of the Related Art

There are several types of cameras. Among the cameras of these types, there is a camera of a type in which, a lens and a camera body are integrated. In an optical system of a camera of such type, a back focus is short. On the other hand, there is a camera of a type in which, a quick return mirror is disposed inside a camera body (single-lens reflex camera). In an optical system of a camera of such type, the back focus is long. In such manner, the back focus of the optical system varies according to the type of the camera. As the back focus varies, a mode of the optical system varies significantly. Therefore, it is necessary to provide an optical system having an appropriate back focus according to the type of the camera. Moreover, in a camera of any type, an optical system with a large zooming ratio has been sought.

As a zoom lens with a large zooming ratio, zoom lenses disclosed in Japanese Patent No. 3598971 and Japanese Patent Application Laid-open publication No. 2007-279622 are available. The zoom lenses disclosed in Japanese Patent No. 3598971 and Japanese Patent Application Laid-open Publication No. 2007-279622 include in order from an object side, a first lens unit having a positive refractive power, a second lens unit having a negative refractive power, a third lens unit having a positive refractive power, and a fourth lens unit having a negative refractive power.

SUMMARY OF THE INVENTION

A zoom lens according to the present invention comprises in order from an object side to an image side, a first lens unit having a positive refractive power,
a second lens unit having a negative refractive power,
a third lens unit having a positive refractive power, and
a fourth lens unit having a negative refractive power, and
the fourth lens unit includes at least two lenses, and
at the time of zooming from a wide angle end to a telephoto end,
a distance between the first lens unit and the second lens unit widens,
a distance between the second lens unit and the third lens unit narrows, and
a distance between the third lens unit and the fourth lens unit fluctuates, and
the total number of lens units included in the zoom lens is four, and
the first lens unit, after moving toward the image side, moves toward the object side.

Moreover, an image pickup apparatus according to the present invention comprises the zoom lens, and
an image pickup element having an image pickup surface.

BRIEF DESCRIPTION OF THE DRAWINGS

FIG. 1A, FIG. 1B, FIG. 1C, FIG. 1D, and FIG. 1E are cross-sectional views along an optical axis showing an optical arrangement at the time of infinite object point focusing of a zoom lens according to an example 1, where, FIG. 1A is a cross-sectional view at a wide angle end, FIG. 1B is a cross-sectional view in an intermediate focal length state 1, FIG. 1C is a cross-sectional view in an intermediate focal length state 2, FIG. 1D is a cross-sectional view in an intermediate focal length state 3, and FIG. 1E is a cross-sectional view at a telephoto end;

FIG. 2A, FIG. 2B, FIG. 2C, FIG. 2D, FIG. 2E, FIG. 2F, FIG. 2G, FIG. 2H, FIG. 2I, FIG. 2J, FIG. 2K, and FIG. 2L are diagrams showing a spherical aberration (SA), an astigmatism (AS), a distortion (DT), and a chromatic aberration of magnification (CC) at the time of infinite object point focusing of the zoom lens according to the example 1, where, FIG. 2A, FIG. 2B, FIG. 2C, and FIG. 2D show a state at the wide angle end, FIG. 2E, FIG. 2F, FIG. 2G, and FIG. 2H show a state in the intermediate focal length state 2, and FIG. 2I, FIG. 2J, FIG. 2K, and FIG. 2L show a state at the telephoto end;

FIG. 3A is a cross-sectional view at a wide angle end, FIG. 3B is a cross-sectional view in an intermediate focal length state 1, FIG. 3C is a cross-sectional view in an intermediate focal length state 2, FIG. 3D is a cross-sectional view in an intermediate focal length state 3, and FIG. 3E is a cross-sectional view at a telephoto end;

FIG. 4A, FIG. 4B, FIG. 4C, FIG. 4D, FIG. 4E, FIG. 4F, FIG. 4G, FIG. 4H, FIG. 4I, FIG. 4J, FIG. 4K, and FIG. 4L are diagrams showing a spherical aberration (SA), an astigmatism (AS), a distortion (DT), and a chromatic aberration of magnification (CC) at the time of infinite object point focusing of the zoom lens according to the example 2, where, FIG. 4A, FIG. 4B, FIG. 4C, and FIG. 4D show a state at the wide angle end, FIG. 4E, FIG. 4F, FIG. 4G, and FIG. 4H show a state in the intermediate focal length state 2, and FIG. 4I, FIG. 4J, FIG. 4K, and FIG. 4L show a state at the telephoto end;

FIG. 5A, FIG. 5B, FIG. 5C, FIG. 5D, and FIG. 5E are cross-sectional views along an optical axis showing an optical arrangement at the time of infinite object point focusing of a zoom lens according to an example 3, where, FIG. 5A is a cross-sectional view at a wide angle end, FIG. 5B is a cross-sectional view in an intermediate focal length state 1, FIG. 5C is a cross-sectional view in an intermediate focal length state 2, FIG. 5D is a cross-sectional view in an intermediate focal length state 3, and FIG. 5E is a cross-sectional view at a telephoto end;

FIG. 6A, FIG. 6B, FIG. 6C, FIG. 6D, FIG. 6E, FIG. 6F, FIG. 6G, FIG. 6H, FIG. 6I, FIG. 6J, FIG. 6K, and FIG. 6L are diagrams showing a spherical aberration (SA), an astigmatism (AS), a distortion (DT), and a chromatic aberration of magnification (CC) at the time of infinite object point focusing of the zoom lens according to the example 3, where, FIG. 6A, FIG. 6B, FIG. 6C, and FIG. 6D show a state at the wide angle end, FIG. 6E, FIG. 6F, FIG. 6G, and FIG.

6H show a state in the intermediate focal length state 2, and FIG. 6I, FIG. 6J, FIG. 6K, and FIG. 6L show a state at the telephoto end;

FIG. 7A, FIG. 7B, FIG. 7C, FIG. 7D, and FIG. 7E are cross-sectional views along an optical axis showing an optical arrangement at the time of infinite object point focusing of a zoom lens according to an example 4, where, FIG. 7A is a cross-sectional view at a wide angle end, FIG. 7B is a cross-sectional view in an intermediate focal length state 1, FIG. 7C is a cross-sectional view in an intermediate focal length state 2, FIG. 7D is a cross-sectional view in an intermediate focal length state 3, and FIG. 7E is a cross-sectional view at a telephoto end;

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are diagrams showing a spherical aberration (SA), an astigmatism (AS), a distortion (DT), and a chromatic aberration of magnification (CC) at the time of infinite object point focusing of the zoom lens according to the example 4, where, FIG. 8A, FIG. 8B, FIG. 8C, and FIG. 8D show a state at the wide angle end, FIG. 8E, FIG. 8F, FIG. 8G, and FIG. 8H show a state in the intermediate focal length state 2, and FIG. 8I, FIG. 8J, FIG. 8K, and FIG. 8L show a state at the telephoto end;

FIG. 9A is a cross-sectional view at a wide angle end, FIG. 9B is a cross-sectional view in an intermediate focal length state 1, FIG. 9C is a cross-sectional view in an intermediate focal length state 2, FIG. 9D is a cross-sectional view in an intermediate focal length state 3, and FIG. 9E is a cross-sectional view at a telephoto end;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are diagrams showing a spherical aberration (SA), an astigmatism (AS), a distortion (DT), and a chromatic aberration of magnification (CC) at the time of infinite object point focusing of the zoom lens according to the example 5, where, FIG. 10A, FIG. 10B, FIG. 10C, and FIG. 10D show a state at the wide angle end, FIG. 10E, FIG. 10F, FIG. 10G, and FIG. 10H show a state in the intermediate focal length state 2, and FIG. 10I, FIG. 10J, FIG. 10K, and FIG. 10L show a state at the telephoto end;

FIG. 11A is a cross-sectional view at a wide angle end, FIG. 11B is a cross-sectional view in an intermediate focal length state 1, FIG. 11C is a cross-sectional view in an intermediate focal length state 2, FIG. 11D is a cross-sectional view in an intermediate focal length state 3, and FIG. 11E is a cross-sectional view at a telephoto end;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L are diagrams showing a spherical aberration (SA), an astigmatism (AS), a distortion (DT), and a chromatic aberration of magnification (CC) at the time of infinite object point focusing of the zoom lens according to the example 6, where, FIG. 12A, FIG. 12B, FIG. 12C, and FIG. 12D show a state at the wide angle end, FIG. 12E, FIG. 12F, FIG. 12G, and FIG. 12H show a state in the intermediate focal length state 2, and FIG. 12I, FIG. 12J, FIG. 12K, and FIG. 12L show a state at the telephoto end;

FIG. 13A, FIG. 13B, FIG. 13C, FIG. 13D, and FIG. 13E are cross-sectional views along an optical axis showing an optical arrangement at the time of infinite object point focusing of a zoom lens according to an example 7, where, FIG. 13A is a cross-sectional view at a wide angle end, FIG. 13B is a cross-sectional view in an intermediate focal length state 1, FIG. 13C is a cross-sectional view in an intermediate focal length state 2, FIG. 13D is a cross-sectional view in an intermediate focal length state 3, and FIG. 13E is a cross-sectional view at a telephoto end;

FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L are diagrams showing a spherical aberration (SA), an astigmatism (AS), a distortion (DT), and a chromatic aberration of magnification (CC) at the time of infinite object point focusing of the zoom lens according to the example 7, where, FIG. 14A, FIG. 14B, FIG. 14C, and FIG. 14D show a state at the wide angle end, FIG. 14E, FIG. 14F, FIG. 14G, and FIG. 14H show a state in the intermediate focal length state 2, and FIG. 14I, FIG. 14J, FIG. 14K, and FIG. 14L show a state at the telephoto end;

DETAILED DESCRIPTION OF THE INVENTION

Figure 1A:
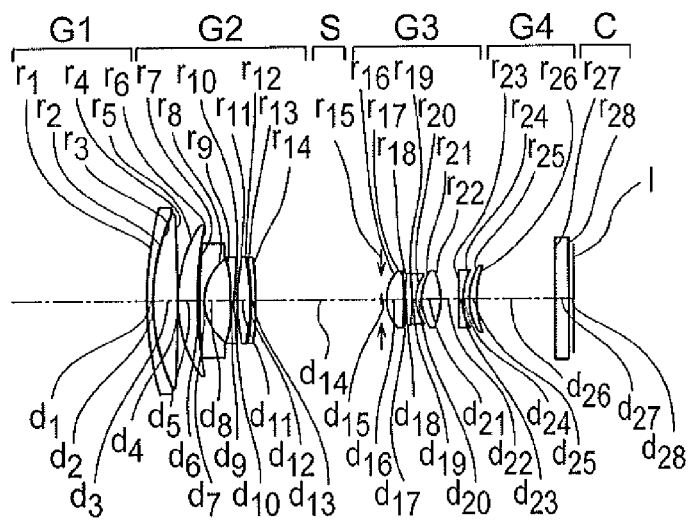

Before explaining the action and the effect of embodiments, an action and an effect of the embodiments according to aspects of the present invention will be described below. For explaining the action and the effect of the embodiments, the description will be made by citing specific examples. However, similar to cases of examples to be described later, aspects to be exemplified are only some of the aspects included in the present invention, and a large number of variations exist for those aspects. Therefore, the present invention is not restricted to the aspects that are exemplified below.

A zoom lens according to a first embodiment includes in order from an object side to an image side, a first lens unit having a positive refractive power, a second lens unit having a negative refractive power, a third lens unit having a positive refractive power, and a fourth lens unit having a negative refractive power, and the fourth lens unit includes at least two lenses, and at the time of zooming from a wide angle end to a telephoto end, a distance between the first lens unit and the second lens unit widens, a distance between the second lens unit and the third lens unit narrows, and a distance between the third lens unit and the fourth lens unit fluctuates, and the first lens unit, after moving toward the image side, moves toward the object side.

In the zoom lens according to the first embodiment, distances between the lens units are changed at the time of zooming from the wide angle end to the telephoto end. Concretely, the distance between the first lens unit and the second lens unit widens and the distance between the second lens unit and the third lens unit narrows. Moreover, the first lens unit, after moving toward the image side, moves toward the object side.

In the zoom lens according to the first embodiment, particularly, by moving the first lens unit toward the object side after moving toward the image side, or in other words, by inverting a direction of movement of the first lens unit, a small-sizing of an optical system is achieved.

Moreover, as the direction of movement of the first lens unit is inverted, it is possible to position the second lens unit further on the image side near a wide angle end as compared to a case of moving the first lens unit only toward the image side. By doing so, it is possible to position the first lens unit as well, further on the image side, at the wide angle end. As a result of this, since it is possible to make a height of an off-axis light ray that passes through a front lens of the first lens unit low, it is possible to make a diameter of the front lens of the first lens unit small. Therefore, correction of a distortion and an astigmatism in an overall optical system can be carried out easily.

Moreover, in the zoom lens according to first present embodiment, the fourth lens unit includes at least two lenses. Accordingly, correction of a spherical aberration and a chromatic aberration in the overall optical system can be carried out favorably. As a result of this, it is possible to secure an improved optical performance and to achieve small-sizing of the optical system. For making the optical system thin, it is preferable to include only two lenses in the fourth lens unit. However, a refractive power of one lens may be shared by refractive power of two lenses. By making such an arrangement, it is possible to make an aberration that occurs in the fourth lens unit small. In this case, the fourth lens unit is formed by including three lenses.

Moreover, in the zoom lens according to the first embodiment, it is preferable that the movement of the second lens unit, at the time of zooming from the wide angle end to the telephoto end, includes at least a movement toward the image side and thereafter, a movement toward the object side.

By moving the second lens unit toward the object side after moving toward the image side, or in other words, by inverting a direction of movement of the second lens unit, small-sizing of the optical system during the course of zooming, and improvement of the optical performance are made possible.

Moreover, as the direction of movement of the second lens unit is inverted, it is possible to make a range of movement of the second lens unit narrower as compared to a case in which, the second lens unit is moved only toward the image side. Therefore, at the wide angle end, it is possible to position the second lens unit on the further image side. By doing so, at the wide angle end, it is possible to position the first lens unit on the further image side. As a result of this, since it is possible to make the height of an off-axis ray that passes through the front lens of the first lens unit low, it is possible to make the diameter of the front lens of the first lens unit small. Therefore, correction of the distortion and the astigmatism in the overall optical system can be carried out easily.

Moreover, since it is possible to make a range of movement toward the image side of the second lens unit narrow, it is possible to make a proportion of load of zooming on the second lens unit large without widening a space between the second lens unit and the third lens unit. In other words, it is possible to let the second lens unit to be one of the lens units that contribute significantly to a zooming ratio of the overall zoom lens system.

A zoom lens according to a second embodiment includes in order from an object side to an image side, a first lens unit having a positive refractive power, a second lens unit having a negative refractive power, a third lens unit having a positive refractive power, and a fourth lens unit having a negative refractive power, and at the time of zooming from a wide angle end to a telephoto end, a distance between the first lens unit and the second lens unit widens, a distance between the second lens unit and the third lens unit narrows, and a distance between the third lens unit and the fourth lens unit fluctuates, and the following conditional expression (1) is satisfied:

$$0.65 < \beta_{2t}/\beta_{3t} < 5 \qquad (1)$$

where, $\beta_{2t}$ denotes a magnification of the second lens unit at the telephoto end, and $\beta_{3t}$ at denotes a magnification of the third lens unit at the telephoto end, and each of $\beta_{2t}$ and $\beta_{3t}$ is a magnification when focused at an infinite object point.

In the zoom lens according to the present embodiment, the distances between the lens units are changed at the time of zooming from the wide angle end to the telephoto end. Concretely, the distance between the first lens unit and the second lens unit widens, and the distance between the second lens unit and the third lens unit narrows. By making such an arrangement, a large proportion of load of zooming is imparted to the second lens unit and the third lens unit. In such manner, in the zoom lens according to the second embodiment, the lens units that contribute to the zooming ratio of the overall zoom lens system are mainly the second lens unit and the third lens unit.

Moreover, the distance between the third lens unit and the fourth lens unit is changed. By making such an arrangement, while the optical system being a small-size optical system, various aberrations are corrected in a balanced manner, and also, an amount of movement of each lens unit is a balanced amount. Such change of distances between the lens units is advantageous for securing a high zooming ratio.

Moreover, the third lens unit is imparted the proportion of load of zooming, and apart from this, is imparted a function of correcting aberration and particularly, a function of correcting a longitudinal aberration. In the third lens unit, a height of an off-axis light ray is low. Therefore, although a lens arrangement in the third lens unit has an effect also on an off axis aberration that occurs in the third lens unit, the effect of the lens arrangement is small. In other words, an amount of the off axis aberration that occurs in the third lens unit is basically small, and even if the off axis aberration changes due to a difference in the lens arrangement of the third lens unit, an amount of change in the off axis aberration being small, an imaging performance at peripheral of an image is not degraded substantially. Therefore, it is possible to make the lens arrangement in the third lens unit with more freedom comparatively.

Moreover, the refractive power of the fourth lens unit is let to be a negative refractive power. By making such an arrangement, it is advantageous for correction of a chromatic aberration of magnification at the wide angle end.

Moreover, in the zoom lens according to the present embodiment, the following conditional expression (1) is satisfied:

$$0.65 < \beta_{2t}/\beta_{3t} < 5 \qquad (1)$$

where, $\beta_{2t}$ denotes a magnification of the second lens unit at the telephoto end, and $\beta_{3t}$ denotes a magnification of the third lens unit at the telephoto end, and each of $\beta_{2t}$ and $\beta_{3t}$ is a magnification when focused at an infinite object point.

Conditional expression (1) is a conditional expression in which, a proportion of the magnification of the second lens unit and the magnification of the third lens unit is regulated. Each of the magnification of the second lens unit and the magnification of the third lens unit is a magnification when focused at an infinite object point at the telephoto end.

By exceeding a lower limit value of conditional expression (1), the proportion of load of zooming on the second lens unit does not become excessively small. In this case, since it is possible to make the amount of movement of the second lens unit small, a total length of the overall optical system at the telephoto end does not become long. Moreover, since the amount of movement of the first lens unit and the second lens unit does not become excessively large, a diameter of the first lens unit and a diameter of the second lens unit do not become large, and a total length of each lens unit also does not become long. Therefore, correction of the distortion at the wide angle end and the longitudinal chromatic aberration at the telephoto end in the overall optical system becomes easy.

By falling below an upper limit value of conditional expression (1), a combined magnification of the lens units from the third lens unit onward does not become excessively small. In this case, it is possible to position the lens units from the third lens unit onward on the further object side. As a result of this, since it is possible to secure a back focus of an appropriate length, it is possible to dispose a component such as an optical filter. Moreover, the proportion of load of zooming on the second lens unit does not become excessively large. Therefore, an aberration which occurs in the first lens unit is not outspread substantially in the second lens unit. As a result of this, correction of the chromatic aberration in the overall optical system in particular, becomes easy.

It is more preferable that the following conditional expression (1') is satisfied instead of conditional expression (1).

$$0.65<\beta_{2t}/\beta_{3t}<4 \tag{1'}$$

Moreover, it is even more preferable that the following conditional expression (1") is satisfied instead of conditional expression (1).

$$0.7<\beta_{2t}/\beta_{3t}<3 \tag{1"}$$

Moreover, in the zoom lens according to the first embodiment and the zoom lens according to the second embodiment (hereinafter, appropriately referred to as the zoom lens according to the present embodiment), it is preferable that the following conditional expression (2) is satisfied:

$$0.48<\beta_{2w}/\beta_{3w}<2 \tag{2}$$

where, $\beta_{2w}$ denotes a magnification of the second lens unit at the wide angle end, and $\beta_{3w}$ denotes a magnification of the third lens unit at the wide angle end, and each of $\beta_{2w}$ and $\beta_{3w}$ is a magnification when focused at an infinite object point.

Conditional expression (2) is a conditional expression in which, the proportion of the magnification of the second lens unit and the magnification of the third lens unit is regulated. Each of the magnification of the second lens unit and the magnification of the third lens unit is a magnification when focused at an infinite object point at the wide angle end.

By exceeding a lower limit value of conditional expression (2), the proportion of load of zooming on the second lens unit does not become excessively small. In this case, since it is possible to make the amount of movement of the second lens unit small, the total length of the overall optical system at the telephoto end does not become long. Therefore, correction of Petzval's sum, the distortion, and the chromatic aberration of magnification in the overall optical system becomes easy.

By falling below an upper limit value of conditional expression (2), the combined magnification of the lens units from the third lens unit onward does not become excessively small. In this case, it is possible to position the lens units from the third lens unit onward on the further object side. As a result of this, since it is possible to secure the back focus of an appropriate length, it is possible to dispose a component such as an optical filter.

It is more preferable that the following conditional expression (2') is satisfied instead of condition expression (2).

$$0.5<\beta_{2w}/\beta_{3w}<1.8 \tag{2'}$$

Moreover, it is even more preferable that the following conditional expression (2") is satisfied instead of conditional expression (2).

$$0.55<\beta_{2w}/\beta_{3w}<1.6 \tag{2"}$$

Moreover, in the zoom lens according to the present embodiment, it is preferable that the following conditional expression (3) is satisfied:

$$3<\beta_{2t}/\beta_{2w}<7 \tag{3}$$

where, $\beta_{2t}$ denotes a magnification of the second lens unit at the telephoto end, and $\beta_{2w}$ denotes a magnification of the second lens unit at the wide angle end, and each of $\beta_{2t}$ and $\beta_{2w}$ is a magnification when focused at an infinite object point.

Conditional expression (3) is a conditional expression in which, a zooming ratio of the second lens unit has been regulated. Each of the magnification of the second lens unit at the telephoto end and the magnification of the second lens unit at the wide angle end is a magnification when focused at an infinite object point.

By exceeding a lower limit value of conditional expression (3), it becomes easy to secure substantially the zooming ratio in the overall optical system.

By falling below an upper limit value of conditional expression (3), the amount of movement of each of the first lens unit and the second lens unit does not become excessively large. Therefore, the diameter of each of the first lens unit and the second lens unit does not become excessively large, and moreover, the total length of the overall optical system does not become long. Therefore, correction of the distortion and the chromatic aberration of magnification at the wide angle end, and the longitudinal chromatic aberration at the telephoto end in the overall optical system becomes easy.

It is more preferable that the following conditional expression (3') is satisfied instead of conditional expression (3).

$$3.1<\beta_{2t}/\beta_{2w}<6 \tag{3'}$$

Moreover, it is even more preferable that the following conditional expression (3") is satisfied instead of conditional expression (3).

$$3.2<\beta_{2t}/\beta_{2w}<5 \tag{3"}$$

Moreover, in the zoom lens according to the present embodiment, it is preferable that the following conditional expression (4) is satisfied:

$$-1.9<\beta_{2t}<-0.75 \qquad (4)$$

where, $\beta_{2t}$ denotes a magnification of the second lens unit at the telephoto end, and is a magnification when focused at an infinite object point.

Conditional expression (4) is a conditional expression in which, the magnification of the second lens unit at the telephoto end has been regulated. The magnification of the second lens unit is a magnification when focused at an infinite object point.

By exceeding a lower limit value of conditional expression (4), the combined magnification of the lens units from the third lens unit onward does not become excessively small. In this case, it is possible to position the lens units from the third lens unit onward further on the object side. As a result of this, since it is possible to secure the back focus of an appropriate length, it is possible dispose a component such as an optical filter.

By falling below an upper limit value of conditional expression (4), the proportion of load of zooming on the second lens unit does not become excessively small. In this case, since it is possible to make the amount of movement of the second lens unit small, the total length of the optical system at the telephoto end does not become long. Therefore, Petzval's sum does not become large.

It is more preferable that the following conditional expression (4') is satisfied instead of conditional expression (4).

$$-1.8<\beta_{2t}<-0.8 \qquad (4')$$

Moreover, it is even more preferable that the following conditional expression (4") is satisfied instead of conditional expression (4).

$$-1.7<\beta_{2t}<-0.9 \qquad (4'')$$

Moreover, in the zoom lens according to the present embodiment, it is preferable that the following conditional expression (5) is satisfied:

$$0.8<TL_t/f_t<1.5 \qquad (5)$$

where, $TL_t$ denotes a total length of the overall zoom lens system at the telephoto end, and is a total length when focused at an infinite object point, and $f_t$ denotes a focal length of the overall zoom lens system at the telephoto end.

Conditional expression (5) is a conditional expression in which, a proportion of the total length of the overall optical system and the focal length of the overall zoom lens system is regulated. Each of the total length and the focal length is a length at the telephoto end, and the total length is a total length when focused at an infinite object point. $TL_t$ is a distance which is not subjected to air conversion.

By exceeding a lower limit value of conditional expression (5), securing an improved optical performance becomes easy. It is possible to correct favorably the chromatic aberration at the telephoto end in particular.

By falling below a lower limit value of conditional expression (5), the total length of the optical system at the telephoto end does not become excessively long. Therefore, it is possible make small-sizing of the optical system.

It is more preferable that the following conditional expression (5') is satisfied instead of conditional expression (5).

$$0.8<TL_t/f_t<1.4 \qquad (5')$$

Moreover, it is even more preferable that the following conditional expression (5") is satisfied instead of conditional expression (5).

$$0.9<TL_t/f_t<1.4 \qquad (5'')$$

Moreover, in the zoom lens according to the present embodiment, it is preferable that the following conditional expression (6) is satisfied:

$$0.3<f_1/f_t<1.0 \qquad (6)$$

where, $f_1$ denotes a focal length of the first lens unit, and $f_t$ denotes a focal length of the overall zoom lens system at the telephoto end.

Conditional expression (6) is a conditional expression in which, a proportion of the focal length of the first lens unit and the focal length of the overall zoom lens system at the telephoto end is regulated.

By exceeding a lower limit value of conditional expression (6), correction of the chromatic aberration at the telephoto end in the overall optical system becomes easy. As a result of this, it is possible to secure an improved optical performance.

By falling below an upper limit value of conditional expression (6), correction of the distortion and the chromatic aberration in the overall optical system becomes easy. As a result of this, it is possible to secure an improved optical performance.

It is more preferable that the following conditional expression (6') is satisfied instead of conditional expression (6).

$$0.3<f_1/f_t<0.8 \qquad (6')$$

Moreover, it is even more preferable that the following conditional expression (6") is satisfied instead of conditional expression (6).

$$0.3<f_1/f_t<0.6 \qquad (6'')$$

Moreover, in the zoom lens according to the present embodiment, it is preferable that the following conditional expression (7) is satisfied:

$$1.4<\beta_{4w}<3 \qquad (7)$$

where, $\beta_{4w}$ denotes a magnification of the fourth lens unit at the telephoto end, and is a magnification when focused at an infinite object point.

Conditional expression (7) is a conditional expression which regulates the magnification of the fourth lens unit at the wide angle end. The magnification of the fourth lens unit is a magnification when focused at an infinite object point.

By exceeding a lower limit value of conditional expression (7), a proportion of load of zooming on the fourth lens unit does not become excessively small at the wide angle end. As a result of this, since an occurrence of the chromatic aberration in the overall optical system is suppressed, it is possible to secure an improved optical performance.

By falling below an upper limit value of conditional expression (7), the proportion of load of zooming on the fourth lens unit does not become excessively large at the wide angle end. As a result of this, since an occurrence of a coma in the overall optical system is suppressed, it is possible to secure an improved optical performance.

It is more preferable that the following conditional expression (7') is satisfied instead of conditional expression (7).

$$1.5 < \beta_{4w} < 2.5 \quad (7')$$

Moreover, it is even more preferable that the following conditional expression (7") is satisfied instead of conditional expression (7).

$$1.6 < \beta_{4w} < 2 \quad (7'')$$

Moreover, it is preferable that the zoom lens according to the present embodiment includes an aperture stop which is disposed between a location nearest to an image plane in the second lens unit and a location nearest to an image plane in the third lens unit, and the aperture stop moves together with the third lens unit.

By integrating the aperture stop with the third lens unit, a height of an off-axis light ray that passes through the third lens unit is suppressed to be low. Therefore, it is possible to form the third lens unit compactly. Moreover, correction of the coma in the overall optical system becomes easy.

Moreover, in the zoom lens according to the present embodiment, it is preferable that the following conditional expression (8) is satisfied:

$$0.77 < |\Delta_{23}/\Delta_{12}| < 2.5 \quad (8)$$

where,
$\Delta_{12}=D_{12W}-D_{12T}$, $\Delta_{23}=D_{23W}-D_{23T}$,
$D_{12W}$ denotes a distance between the first lens unit and the second lens unit at the wide angle end,
$D_{12T}$ denotes a distance between the first lens unit and the second lens unit at the telephoto end,
$D_{23W}$ denotes a distance between the second lens unit and the third lens unit at the wide angle end, and
$D_{23T}$ denotes a distance between the second lens unit and the third lens unit at the telephoto end.

Conditional expression (8) is a conditional expression which regulates a proportion of an amount of change in the distance between the first lens unit and the second lens unit and an amount of change in the distance between the second lens unit and the third lens unit. The amount of change in the distance is to be calculated from a distance at the wide angle end and a distance at the telephoto end.

By falling below an upper limit value of conditional expression (8), a position of an entrance pupil which is on the object side of the first lens unit is not drawn apart excessively from the first lens unit at the wide angle end. As a result of this, since a height of an off-axis light ray that passes through the first lens unit and the second lens unit does not become high, an amount of distortion which occurs in the overall optical system does not increase. Moreover, falling below the upper limit value of conditional expression (8) is advantageous for small-sizing of the optical system and for widening an angle of view of the optical system.

By exceeding a lower limit value of conditional expression (8), the proportion of load of zooming on the second lens unit does not become excessively small. Therefore, it is possible to secure the zooming ratio appropriately in the second lens unit without making the overall length of the optical system long.

It is more preferable that the following conditional expression (8') is satisfied instead of conditional expression (8).

$$0.8 < |\Delta_{23}/\Delta_{12}| < 2.0 \quad (8')$$

Moreover, it is even more preferable that the following conditional expression (8") is satisfied instead of conditional expression (8).

$$0.9 < |\Delta_{23}/\Delta_{12}| < 1.5 \quad (8'')$$

Moreover, in the zoom lens according to the present embodiment, it is preferable that the following conditional expression (9) is satisfied:

$$D_{3a\_max}/D_{3L-max} < 1.2 \quad (9)$$

where,
$D_{3a\_max}$ denotes a maximum air space from among air spaces in the third lens unit, and
$D_{3L-max}$ denotes a maximum lens thickness from among thickness of lenses in the third lens unit.

Conditional expression (9) is a conditional expression in which, a proportion of the maximum air space in the third lens unit and the maximum lens thickness in the third lens unit has been regulated. By satisfying conditional expression (9), a thickness of the overall third lens unit does not increase excessively. Therefore, small-sizing and slimming of the overall optical system are possible.

It is preferable that the maximum air space in the third lens unit is smaller than a thickness of each lens. By making such an arrangement, it is possible to reduce further the thickness of the overall third lens unit. Therefore, further small-sizing and slimming of the overall optical system are possible.

It is more preferable that the following conditional expression (9') is satisfied instead of conditional expression (9).

$$D_{3a\_max}/D_{3L-max} < 1.1 \quad (9')$$

Moreover, it is even more preferable that the following conditional expression (9") is satisfied instead of conditional expression (9).

$$D_{3a\_max}/D_{3L-max} < 1.0 \quad (9'')$$

Moreover, in the zoom lens according to the present embodiment, it is preferable that the following conditional expression (10) is satisfied:

$$D_{4a\_max}/D_{4L-sum} < 1.1 \quad (10)$$

where,
$D_{4a\_max}$ denotes a maximum air space from among air spaces in the fourth lens unit, and
$D_{4L-sum}$ denotes a sum of thickness of lenses in the fourth lens unit.

Conditional expression (10) is a conditional expression in which, a proportion of the maximum air space in the fourth lens unit and the sum of thickness of lenses in the fourth lens unit has been regulated. By satisfying conditional expression (10), an outer diameter of the fourth lens unit does not become excessively large.

It is preferable that the maximum air space in the fourth lens unit is smaller than the sum of thickness of lenses in the fourth lens unit. By making such an arrangement, it is possible to reduce further the thickness of the overall fourth lens unit. Therefore, further small-sizing and slimming of the overall optical system are possible.

It is more preferable that the following conditional expression (10') is satisfied instead of conditional expression (10).

$$D_{4a\_max}/D_{4L-sum} < 1.0 \quad (10')$$

Moreover, it is even more preferable that the following conditional expression (10") is satisfied instead of conditional expression (10).

$$D_{4a\_max}/D_{4L-sum} < 0.9 \quad (10'')$$

Moreover, in the zoom lens according to the present embodiment, it is preferable that the fourth lens unit includes a lens which is disposed nearest to an object, and a lens which is disposed nearest to an image, and the following conditional expression (11) is satisfied:

$$0.01<|(r_{4f}+r_{4b})|/|(r_{4f}-r_{4b})|<4.35 \quad (11)$$

where, $r_{4f}$ denotes a paraxial radius of curvature of an object-side lens surface of the lens disposed nearest to the object, and $r_{4b}$ denotes a paraxial radius of curvature of an image-side lens surface of the lens disposed nearest to the image.

In the zoom lens according to the present embodiment, the fourth lens unit includes the lens which is disposed nearest to the object and the lens which is disposed nearest to the image. Conditional expression (11) is an expression related to an object-side lens surface of the lens disposed nearest to the object and an image-side lens surface of the lens disposed nearest to the image.

Either by exceeding a lower limit value of conditional expression (11) or by falling below an upper limit value of conditional expression (11), correction of the spherical aberration and the coma in the overall optical system becomes easy. As a result of this, it is possible to secure an improved optical performance.

It is more preferable that the following conditional expression (11') is satisfied instead of conditional expression (11).

$$0.01<|(r_{4f}+r_{4b})|/|(r_{4f}-r_{4b})|<4 \quad (11')$$

Moreover, it is even more preferable that the following conditional expression (11") is satisfied instead of conditional expression (11).

$$0.01<|(r_{4f}+r_{4b})|/|(r_{4f}-r_{4b})|<2 \quad (11'')$$

Moreover, in the zoom lens according to the present embodiment, it is preferable that the fourth lens unit includes a lens which is disposed nearest to an object, and the following conditional expression (12) is satisfied:

$$0.4<|(r_{4ff}+r_{4fb})|/|(r_{4ff}-r_{4fb})|<2.2 \quad (12)$$

where, $r_{4ff}$ denotes a paraxial radius of curvature of an object-side lens surface of the lens disposed nearest to the object, and $r_{4fb}$ denotes a paraxial radius of curvature of an image-side lens surface of the lens disposed nearest to the object.

In the zoom lens according to the present embodiment, the fourth lens unit includes the lens which is disposed nearest to the object. Conditional expression (12) is a conditional expression related to a lens shape (lens surface) of the lens disposed nearest to the object.

Either by exceeding a lower limit value of conditional expression (12) or by falling below an upper limit value of conditional expression (12), correction of the spherical aberration and the longitudinal chromatic aberration in the overall optical system becomes easy. As a result, it is possible to secure an improved optical performance.

It is more preferable that the following conditional expression (12') is satisfied instead of conditional expression (12).

$$0.4<|(r_{4ff}+r_{4fb})|/|(r_{4ff}-r_{4fb})|<2.0 \quad (12')$$

Moreover, it is even more preferable that the following conditional expression (12") is satisfied instead of conditional expression (12).

$$0.5<|(r_{4ff}+r_{4fb})|/|(r_{4ff}-r_{4fb})|<1.7 \quad (12'')$$

Moreover, in the zoom lens according to the present embodiment, it is preferable that the fourth lens unit includes a lens which is disposed nearest to an image, and the following conditional expression (13) is satisfied:

$$0.4<|(r_{41f}+r_{41b})|/|(r_{41f}-r_{41b})|<7 \quad (13)$$

where, $r_{41f}$ denotes a paraxial radius of curvature of an object-side lens surface of the lens disposed nearest to the image, and $r_{41b}$ denotes a paraxial radius of curvature of an image-side lens surface of the lens disposed nearest to the image.

In the zoom lens according to the present embodiment, the fourth lens unit includes the lens which is disposed nearest to the image. Conditional expression (13) is a conditional expression related to a lens shape (lens surface) of the lens disposed nearest to the image.

Either by exceeding a lower limit value of conditional expression (13) or by falling below an upper limit value of conditional expression (13), correction of the distortion at the wide angle end and the coma at the telephoto end in the overall optical system becomes easy. As a result of this, it is possible to secure an improved optical performance.

It is more preferable that the following conditional expression (13') is satisfied instead of conditional expression (13).

$$0.7<|(r_{41f}+r_{41b})|/|(r_{41f}-r_{41b})|<6 \quad (13')$$

Moreover, it is even more preferable the following conditional expression (13") is satisfied instead of conditional expression (13).

$$1<|(r_{41f}+r_{41b})|/|(r_{41f}-r_{41b})|<5 \quad (13'')$$

Moreover, in the zoom lens according to the present embodiment, it is preferable that the fourth lens unit includes a lens which is disposed nearest to an image, and a shape of an image-side lens surface of the lens disposed nearest to the image is a shape having a concave surface directed toward the image side.

By making such an arrangement, correction of a curvature of field and the coma in the overall optical system becomes easy. As a result of this, it is possible to secure an improved optical performance.

Moreover, in the zoom lens according to the present embodiment, it is preferable that the second lens unit includes a lens which is disposed nearest to an object, and the following conditional expression (14) is satisfied:

$$0.5<(r_{2ff}+r_{2fb})/(r_{2ff}-r_{2fb})<1.7 \quad (14)$$

where, $r_{2ff}$ denotes a paraxial radius of curvature of an object-side lens surface of the lens disposed nearest to the object in the second lens unit, and $r_{2fb}$ denotes a paraxial radius of curvature of an image-side lens surface of the lens disposed nearest to the object in the second lens unit.

In the zoom lens according to the present embodiment, the second lens unit includes the lens which is disposed nearest to the object. Conditional expression (14) is a conditional expression related to a lens shape (lens surface) of the lens disposed nearest to the object.

By exceeding a lower limit value of conditional expression (14), the refractive power of the second lens unit does not become excessively large. In this case, at the wide angle end, a negative distortion does not occur remarkably. As a result of this, it is possible to secure an improved optical performance.

By falling below an upper limit value of conditional expression (14), the refractive power of the second lens unit does not become excessively small. Therefore, it is possible to widen an angle of view of the optical system. Moreover, the total length of the optical system at the wide angle end does not become long, and a diameter of a front lens does not become large even when quantity of light at peripheral is secured appropriately.

It is more preferable that the following conditional expression (14') is satisfied instead of conditional expression (14).

$$0.6<(r_{2ff}+r_{2fb})/(r_{2ff}-r_{2fb})<1.68 \qquad (14')$$

Moreover, it is even more preferable that the following conditional expression (14") is satisfied instead of conditional expression (14).

$$0.7<(r_{2ff}+r_{2fb})/(r_{2ff}-r_{2fb})<1.65 \qquad (14'')$$

Moreover, in the zoom lens according to the present embodiment, it is preferable that the second lens unit includes at least two lenses having a negative refractive power, and the two lenses having a negative refractive power are disposed to be adjacent in order from the object side.

For securing a wide angle of view and a large zooming ratio, making the refractive power of the second lens unit large is effective. Therefore, in the zoom lens according to the present embodiment, in the second lens unit, lenses are arranged in order of a lens having a negative refractive power and a lens having a negative refractive power from the object side. By having at least such lens arrangement, it is possible to make an arrangement to share the refractive power of the second lens unit by two lenses.

Moreover, in a case in which, the lens having a negative refractive power is disposed nearest to the object, it is possible to make gentle a shape of a lens surface of the lens having a negative refractive power. As a result of this, since at the wide angle end, occurrence of the coma in the overall optical system is suppressed, it is possible to secure an improved optical performance.

Moreover, in the zoom lens according to the present embodiment, it is preferable that the following conditional expression (15) is satisfied:

$$-1.1<f_2/f_w<-0.5 \qquad (15)$$

where, $f_2$ denotes a focal length of the second lens unit, and $f_w$ denotes a focal length of the overall zoom lens system at the wide angle end.

Conditional expression (15) is a conditional expression in which, a proportion of the focal length of the second lens unit and the focal length of the overall zoom lens system at the wide angle end is regulated.

Exceeding a lower limit value of conditional expression (15) is advantageous from a point of view of aberration correction.

By falling below an upper limit value of conditional expression (15), Petzval's sum does not become significantly negative. As a result of this, the curvature of field does not become large, and moreover, a negative distortion at the wide angle end does not increase.

It is more preferable that the following conditional expression (15') is satisfied instead of conditional expression (15).

$$-1.0<f_2/f_w<-0.6 \qquad (15')$$

Moreover, it is even more preferable that the following conditional expression (15") instead of conditional expression (15).

$$-0.9<f_2/f_w<-0.7 \qquad (15'')$$

Moreover, in the zoom lens according to the present embodiment, it is preferable that the following conditional expression (16) is satisfied:

$$1.8<nd_{2ave} \qquad (16)$$

where, $nd_{2ave}$ denotes an average value of refractive index for a d-line of the second lens unit.

It is preferable to use a material having a high refractive index for lenses in the second lens unit. If conditional expression (16) is satisfied, in a case in which a lens having a negative refractive power is disposed in the second lens unit, it is possible to make a paraxial radius of curvature of the lens (lens surface) having a negative refractive power large. Therefore, it is possible to make a thickness in an optical axial direction of the second lens unit thin. Moreover, by making thin the thickness of the second lens unit, it is possible to shorten a distance from the first lens unit up to the aperture stop, at the wide angle end. As a result of this, it is possible to make the diameter of the front lens small.

It is more preferable that the following conditional expression (16') is satisfied instead of conditional expression (16).

$$1.82<nd_{2ave} \qquad (16')$$

Moreover, it is even more preferable that the following conditional expression (16") is satisfied instead of conditional expression (16).

$$1.87<nd_{2ave} \qquad (16'')$$

Moreover, in a zoom lens according to the second embodiment, it is preferable that at the time of zooming from the wide angle end to the telephoto end, the first lens unit, after moving toward the image side, moves toward the object side.

By inverting the direction of movement of the first lens unit, it is possible to achieve small-sizing of the optical system. Moreover, as the direction of movement of the first lens unit is inverted, it is possible to position the second lens unit on the further image side near the wide angle end, as compared to a case in which, the first lens unit is moved only toward the image side. By doing so, it is possible to position the first lens unit also on the further image side at the wide angle end. As a result of this, since it is possible to make a height of an off-axis light ray that passes through the front lens in the first lens unit low, it is possible to make small a diameter of the front lens in the first lens unit. Therefore, correction of the distortion and the astigmatism in the overall optical system can be carried out easily.

In the zoom lens according to the second embodiment, it is preferable that a movement of the second lens unit at the time of zooming from the wide angle end to the telephoto end includes at least a movement toward the image side, and thereafter, a movement toward the object side.

By moving the first lens unit toward the object side after moving toward the image side, or in other words, by inverting a direction of movement of the second lens unit, an improvement in an optical performance and small-sizing of the optical system during the course of zooming are made possible.

Moreover, as the direction of movement of the second lens unit is inverted, it is possible to narrow a range of movement of the second lens unit as compared to a range in a case in which, the second lens unit is moved only toward the image side. Therefore, it is possible to position the second lens unit on the further image side, at the wide angle end. By doing so, it is possible to position the first lens unit as well, on the further image side. As a result of this, since it is possible to make the height of an off-axis light ray that passes through the front lens of the first lens unit low, it is possible to make the diameter of the front lens in the first lens unit small. Therefore, correction of the distortion and the astigmatism in the overall optical system can be carried out easily.

Since it is possible to narrow the range of movement toward the image side of the second lens unit, it is possible to make the proportion of load of zooming on the second lens unit large without widening a space between the second lens unit and the third lens unit. In other words, it is possible to let the second lens unit to be one of the lens units that contribute significantly to the zooming ratio of the overall zoom lens system.

Moreover, in the zoom lens according to the present embodiment, distances between the lens units are changed at the time of zooming from the wide angle end to the telephoto end. For changing the distances between the lens units, each lens unit is to be moved along an optical axis.

Moreover, an image pickup apparatus according to the present embodiment includes one of the aforementioned zoom lenses, and an image pickup element having an image pickup surface. By making such an arrangement, it is possible to realize an image pickup apparatus which includes a zoom lens having an improved imaging performance and which is small-sized and slim.

Regarding each conditional expression, it is preferable to fulfil that function more assuredly by restricting one or both of a lower limit value and an upper limit value. Moreover, regarding each conditional expression, only an upper limit value or a lower limit value of a numerical range of the further restricted conditional expression may be restricted. Furthermore, for restricting the numerical range of a conditional expression, either an upper limit value or a lower limit value of each conditional expression may be let to be either an upper limit value or a lower limit value of another conditional expression.

Examples of zoom lenses according to certain aspects of the present invention will be described below in detail by referring to the accompanying diagrams. However, the present invention is not restricted to the examples described below. Moreover, whether the refractive power is a positive refractive power or a negative refractive power is based on a paraxial radius of curvature.

Cross-sectional views along an optical axis showing an optical arrangement indicate five states. An intermediate focal length state 1 is a state between a wide angle end and an intermediate focal length state 2, and intermediate focal length state 3 is a state between the intermediate focal length state 2 and the telephoto end. Moreover, aberration diagrams indicate three states.

Figure 1B:
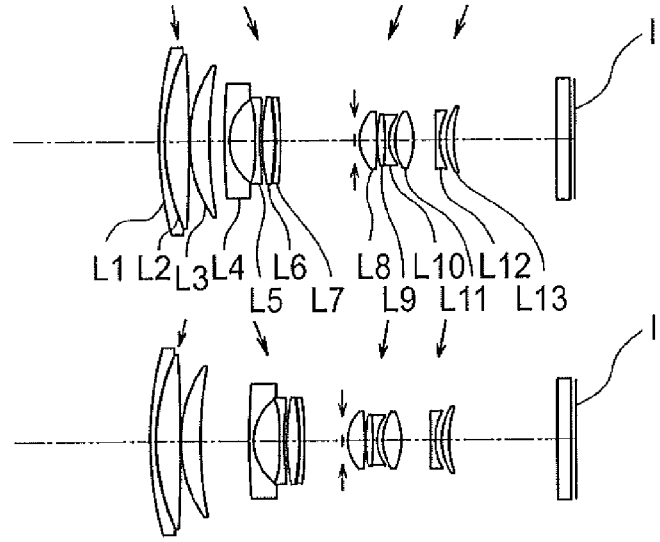
Figure 1C:
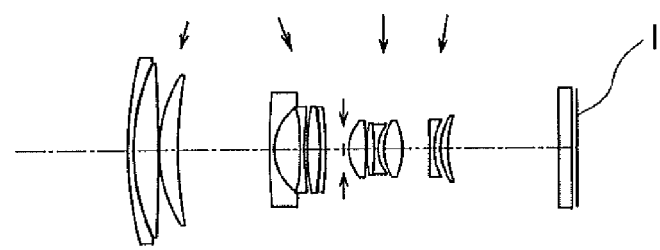
Figure 1E:
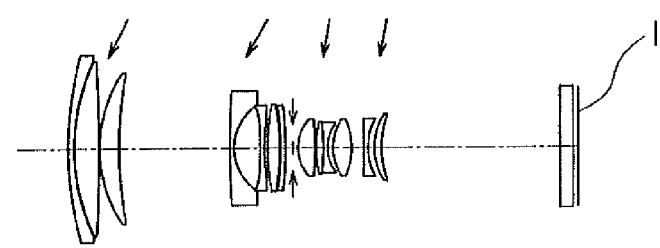
Figure 3A:
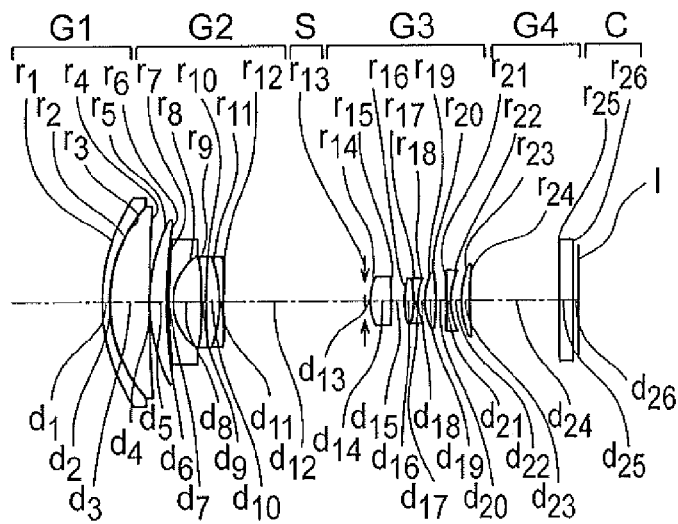
FIG. 3A, FIG. 3B, FIG. 3C, FIG. 3D, and FIG. 3E are cross-sectional views along an optical axis showing an optical arrangement at the time of infinite object point focusing of a zoom lens according to an example 2, where.
Figure 3B:
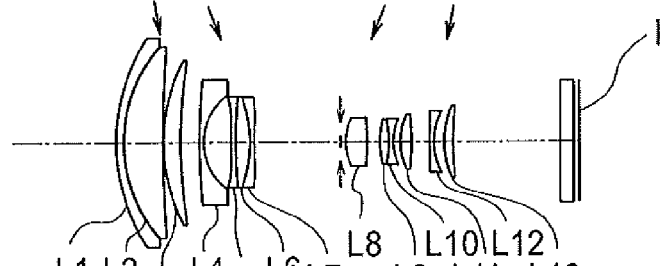
Figure 3C:
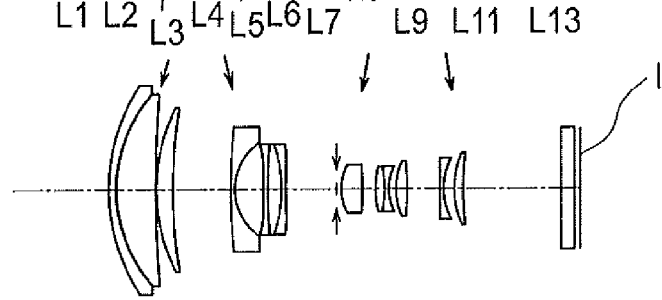
Figure 3D:
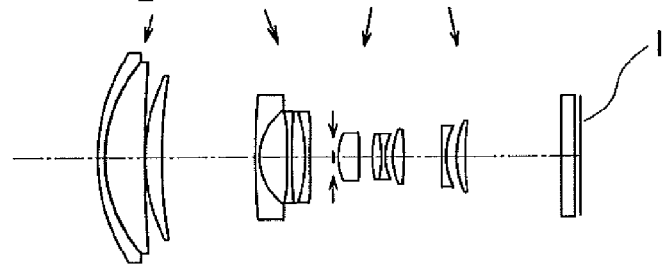
Figure 3E:
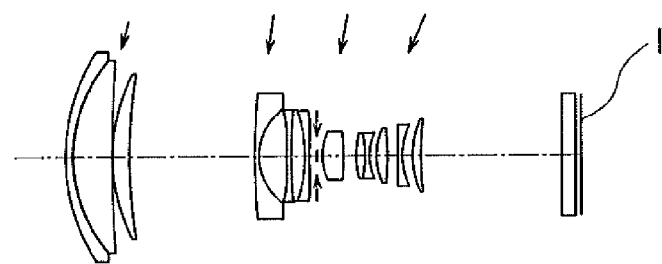
Figure 9A:
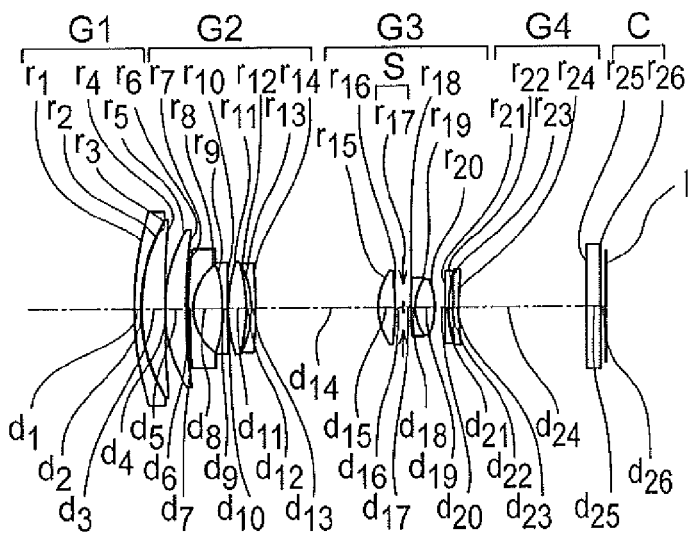
FIG. 9A, FIG. 9B, FIG. 9C, FIG. 9D, and FIG. 9E are cross-sectional views along an optical axis showing an optical arrangement at the time of infinite object point focusing of a zoom lens according to an example 5, where.
Figure 9B:
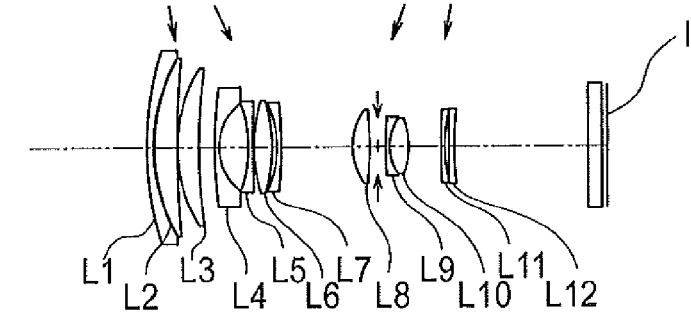
Figure 9C:
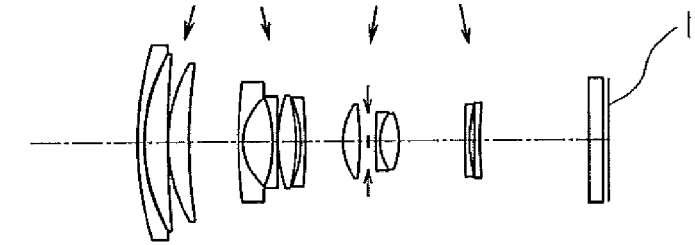
Figure 9D:
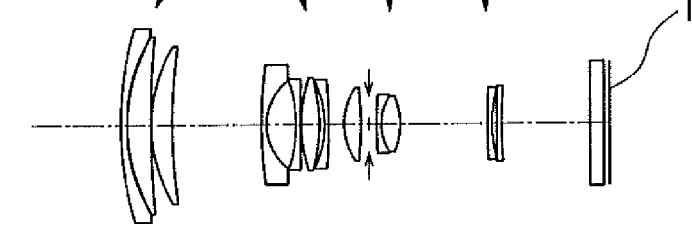
Figure 9E:
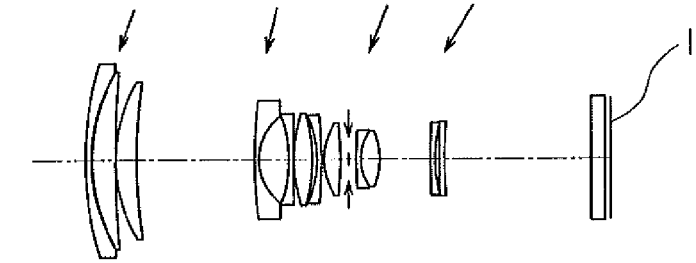
Figures 11A, 11B, 11C, 11D, 11E:
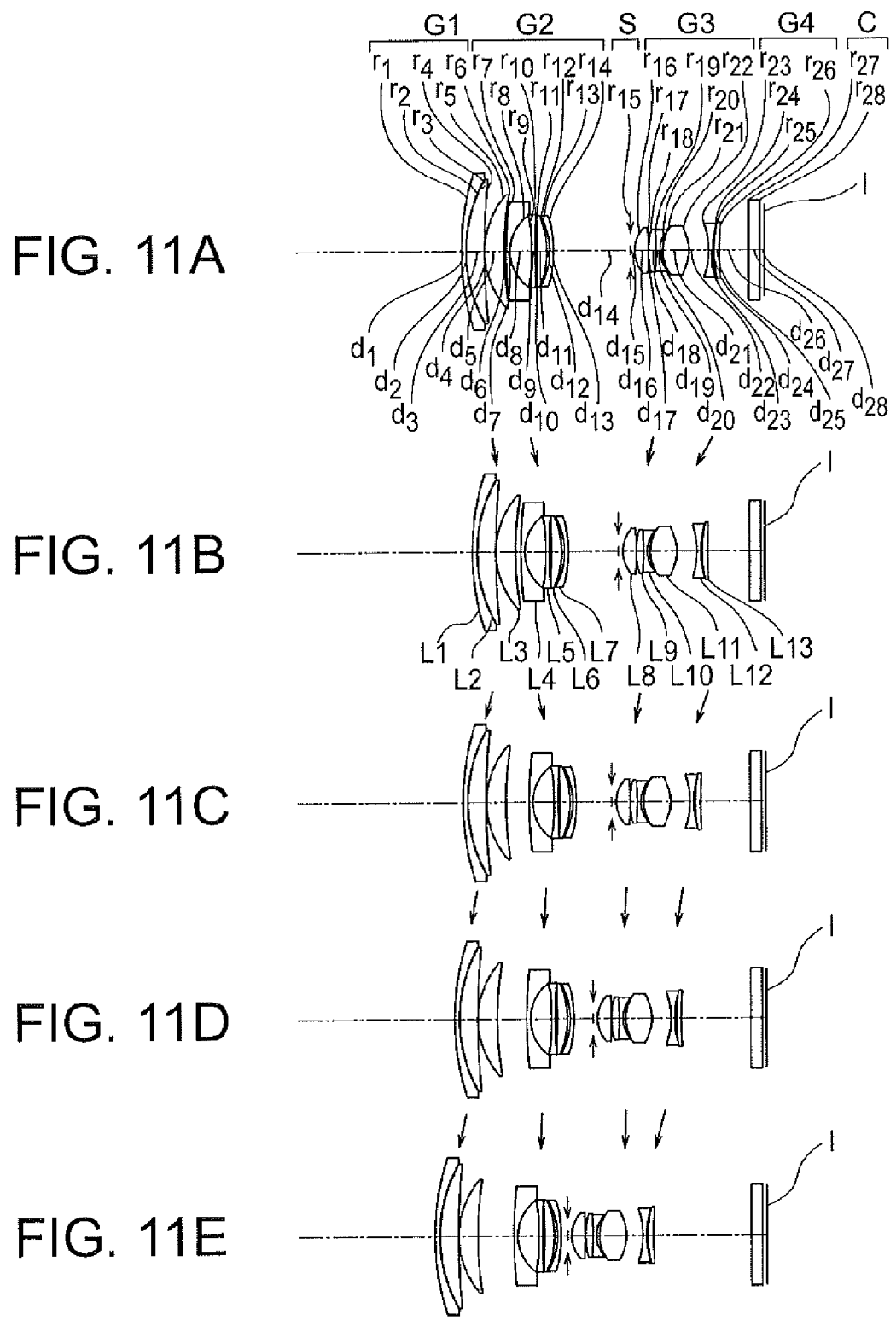
FIG. 11A, FIG. 11B, FIG. 11C, FIG. 11D, and FIG. 11E are cross-sectional views along an optical axis showing an optical arrangement at the time of infinite object point focusing of a zoom lens according to an example 6, where.

A zoom lens according to an example 1 will be described below. FIG. 1A, FIG. 1B, FIG. 1C, FIG. 1D, and FIG. 1E are cross-sectional vies (lens cross-sectional views) along an optical axis showing an optical arrangement at the time of infinite object point focusing of the zoom lens according to the example 1, where, FIG. 1A is a cross-sectional view at a wide angle end, FIG. 1B is a cross-sectional view in an intermediate focal length state 1, FIG. 1C is a cross-sectional view in an intermediate focal length state 2, FIG. 1D is a cross-sectional view in an intermediate focal length state 3, and FIG. 1E is a cross-sectional view at a telephoto end. In all the examples described below, in lens cross-sectional views, C denotes a cover glass, and I denotes an image pickup surface of an image pickup element.

FIG. 2A, FIG. 2B, FIG. 2C, FIG. 2D, FIG. 2E, FIG. 2F, FIG. 2G, FIG. 2H, FIG. 2I, FIG. 2J, FIG. 2K, and FIG. 2L are aberration diagrams at the time of infinite object point focusing of the zoom lens according to the example 1, and $\omega$ denotes an half angle of view. Symbols in aberrations diagrams are same also for the embodiments described later.

Moreover, in these aberrations diagrams, FIG. 2A, FIG. 2B, FIG. 2C, and FIG. 2D show a spherical aberration (SA), an astigmatism (AS), a distortion (DT), and a chromatic aberration of magnification (CC) respectively, at the wide angle end.

Moreover, FIG. 2E, FIG. 2F, FIG. 2G, and FIG. 2H show a spherical aberration (SA), an astigmatism (AS), a distortion (DT), and a chromatic aberration of magnification (CC) respectively, in the intermediate focal length state 2.

Furthermore, FIG. 2I, FIG. 2J, FIG. 2K, and FIG. 2L show a spherical aberration (SA), an astigmatism (AS), a distortion (DT), and a chromatic aberration of magnification (CC) respectively, at the telephoto end.

The zoom lens according to the example 1, as shown in FIG. 1A, FIG. 1B, FIG. 1C, FIG. 1D, and FIG. 1E, includes in order from an object side, a first lens unit G1 having a positive refractive power, a second lens unit G2 having a negative refractive power, a third lens unit G3 having a positive refractive power, and a fourth lens unit G4 having a negative refractive power. Moreover, an aperture stop S is disposed between a location nearest to an image plane in the second lens unit G2 and a location nearest to an image plane in the third lens unit G3.

The first lens unit G1 includes a negative meniscus lens L1 having a convex surface directed toward the object side, a biconvex positive lens L2, and a positive meniscus lens L3 having a convex surface directed toward the object side.

The second lens unit G2 includes a negative meniscus lens L4 having a convex surface directed toward the object side, a negative meniscus lens L5 having a convex surface directed toward the object side, a biconvex positive lens L6, and a negative meniscus lens L7 having a convex surface directed toward an image side.

The third lens unit G3 includes a biconvex positive lens L8, a biconvex positive lens L9, a biconcave negative lens L10, and a biconvex positive lens L11. Here, the biconvex positive lens L9 and the biconcave negative lens L10 are cemented. Moreover, the aperture stop S is disposed between the negative meniscus lens L7 and the biconvex positive lens L8.

The fourth lens unit G4 includes a biconcave negative lens L12 and a positive meniscus lens L13 having a convex surface directed toward the object side.

At the time of zooming from a wide angle end to a telephoto end, a distance between the first lens unit G1 and the second lens unit G2 widens, a distance between the second lens unit G2 and the third lens unit G3 narrows, and a distance between the third lens unit G3 and the fourth lens unit G4 fluctuates. The aperture stop S moves together with the third lens unit G3.

More elaborately, the first lens unit G1, after moving toward the image side, moves toward the object side. The second lens unit G2, after moving toward the image side, moves toward the object side. The third lens unit G3, after moving toward the object side, moves toward the image side, and thereafter, moves toward the object side. The fourth lens unit G4 moves toward the object side.

The movement of the first lens unit G1 toward the image side is from the wide angle end up to the intermediate focal length state 1. Moreover, the movement of the second lens unit G2 toward the image side is from the wide angle end up to the intermediate focal length state 3. The movement of the third lens unit G3 toward the object side is from the wide angle end up to the intermediate focal length state 2, and from the intermediate focal length state 3 up to the telephoto end. An amount of movement of the third lens unit toward the image side is extremely minute.

An aspheric surface is provided to a total of nine surfaces namely, both surfaces of the negative meniscus lens L5, an image-side surface of the negative meniscus lens L7, both surfaces of the biconvex positive lens L8, both surfaces of the biconvex positive lens L11, and both surfaces of the positive meniscus lens L13.

Next, a zoom lens according to an example 2 will be described below. FIG. 3A, FIG. 3B, FIG. 3C, FIG. 3D, and FIG. 3E are cross-sectional views along an optical axis showing an optical arrangement at the time of infinite object point focusing of the zoom lens according to the example 2. FIG. 4A, FIG. 4B, FIG. 4C, FIG. 4D, FIG. 4E, FIG. 4F, FIG. 4G, FIG. 4H, FIG. 4I, FIG. 4J, FIG. 4K, and FIG. 4L are aberration diagrams at the time of infinite object point focusing of the zoom lens according to the example 2.

The zoom lens according to the example 2, as shown in FIG. 3A, FIG. 3B, FIG. 3C, FIG. 3D, and FIG. 3E, includes in order from an object side, a first lens unit G1 having a positive refractive power, a second lens unit G2 having a negative refractive power, a third lens unit G3 having a positive refractive power, and a fourth lens unit G4 having a negative refractive power. Moreover, an aperture stop S is disposed between a location nearest to an image plane in the second lens unit G2 and a location nearest to an image plane in the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side.

The second lens unit G2 includes a negative meniscus lens L4 having a convex surface directed toward the object side, a negative meniscus lens L5 having a convex surface directed toward the object side, a biconvex positive lens L6, and a biconcave negative lens L7. Here, the negative meniscus lens L5, the biconvex positive lens L6, and the biconcave negative lens L7 are cemented.

The third lens unit G3 includes a biconvex positive lens L8, a biconvex positive lens L9, a biconcave negative lens L10, and a biconvex positive lens L11. Here, the biconvex positive lens L9 and the biconcave negative lens L10 are cemented. Moreover, the aperture stop S is disposed between the biconcave negative lens L7 and the biconvex positive lens L8.

The fourth lens unit G4 includes a biconcave negative lens L12 and a positive meniscus lens L13 having a convex surface directed toward the object side.

At the time of zooming from a wide angle end to a telephoto end, a distance between the first lens unit G1 and the second lens unit G2 widens, a distance between the second lens unit G2 and the third lens unit G3 narrows, and a distance between the third lens unit G3 and the fourth lens unit G4 fluctuates. The aperture stop S moves together with the third lens unit G3.

More elaborately, the first lens unit G1, after moving toward the image side, moves toward the object side. The second lens unit G2, after moving toward the image side, moves toward the object side. The third lens unit G3 moves toward the object side. The fourth lens unit G4, after moving toward the object side, moves toward the image side, and thereafter, moves toward the object side.

The movement of the first lens unit G1 toward the image side is from the wide angle end up to the intermediate focal length state 1. Moreover, the movement of the second lens unit G2 toward the image side is from the wide angle end up to intermediate focal length state 3. The movement of the fourth lens unit G4 toward the object side is from the wide angle end up to the intermediate focal length state 1, and from the intermediate focal length state 3 up to the telephoto end.

An aspheric surface is provided to a total of five surfaces namely, an object-side surface of the negative meniscus lens L5, an image-side surface of the biconcave negative lens L7, an object-side surface of the biconvex positive lens L8, an image-side surface of the biconvex positive lens L11, and an object-side surface of the positive meniscus lens L13.

Next, a zoom lens according to an example 3 will be described below. FIG. 5A, FIG. 5B, FIG. 5C, FIG. 5D, and FIG. 5E are cross-sectional views along an optical axis showing an optical arrangement at the time of infinite object point focusing of the zoom lens according to the example 3. FIG. 6A, FIG. 6B, FIG. 6C, FIG. 6D, FIG. 6E, FIG. 6F, FIG. 6G, FIG. 6H, FIG. 6I, FIG. 6J, FIG. 6K, and FIG. 6L are aberration diagrams at the time of infinite object point focusing of the zoom lens according to the example 3.

The zoom lens according to the example 3, as shown in FIG. 5A, FIG. 5B, FIG. 5C, FIG. 5D, and FIG. 5E, includes in order from an object side, a first lens unit G1 having a positive refractive power, a second lens unit G2 having a negative refractive power, a third lens unit G3 having a positive refractive power, and a fourth lens unit G4 having a negative refractive power. Moreover, an aperture stop S is disposed between a location nearest to an image plane in the second lens unit G2 and a location nearest to an image plane in the third lens unit G3.

The first lens unit G1 includes a negative meniscus lens L1 having a convex surface directed toward the object side, a biconvex positive lens L2, and a positive meniscus lens L3 having a convex surface directed toward the object side.

The second lens unit G2 includes a biconcave negative lens L4, a negative meniscus lens L5 having a convex surface directed toward an image side, and a biconvex positive lens L6.

The third lens unit G3 includes a biconvex positive lens L7, a negative meniscus lens L8 having a convex surface directed toward the object side, and a biconvex positive lens L9. Here, the negative meniscus lens L8 and the biconvex positive lens L9 are cemented. Moreover, the aperture stop S is disposed between the biconvex positive lens L6 and the biconvex positive lens L7.

The fourth lens unit G4 includes a biconcave negative lens L10 and a positive meniscus lens L11 having a convex surface directed toward the object side.

At the time of zooming from a wide angle end to a telephoto end, a distance between the first lens unit G1 and the second lens unit G2 widens, a distance between the second lens unit G2 and the third lens unit G3 narrows, and a distance between the third lens unit G3 and the fourth lens unit G4 fluctuates. The aperture stop S moves together with the third lens unit G3.

More elaborately, the first lens unit G1, after moving toward the image side, moves toward the object side. The second lens unit G2, after moving toward the image side, moves toward the object side. The third lens unit G3 moves toward the object side. The fourth lens unit G4 moves toward the object side.

The movement of the first lens unit G1 toward the image side is from the wide angle end up to an intermediate focal length state 1. Moreover, the movement of the second lens unit G2 toward the image side is from the wide angle end up to the intermediate focal length state 3. In the movement of the third lens unit G3 toward the object side, an amount of movement from the intermediate focal lengths state 2 up to the intermediate focal length state 3 is extremely minute.

An aspheric surface is provided to a total of nine surfaces namely, both surfaces of the biconcave negative lens L4, both surfaces of the negative meniscus lens L5, both surfaces of the biconvex positive lens L7, an image-side surface of the biconvex positive lens L9, and both surfaces of the positive meniscus lens L11.

Next, a zoom lens according to an example 4 will be described below. FIG. 7A, FIG. 7B, FIG. 7C, FIG. 7D, and FIG. 7E are cross-sectional views along an optical axis showing an optical arrangement at the time of infinite object point focusing of the zoom lens according to the example 4. FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are aberration diagrams at the time of infinite object point focusing of the zoom lens according to the example 4.

The zoom lens according to the example 4, as shown in FIG. 7A, FIG. 7B, FIG. 7C, FIG. 7D, and FIG. 7E, includes in order from an object side, a first lens unit G1 having a positive refractive power, a second lens unit G2 having a negative refractive power, a third lens unit G3 having a positive refractive power, and a fourth lens unit G4 having a negative refractive power. Moreover, an apertures stop S is disposed between a location nearest to an image plane in the second lens unit G2 and a location nearest to an image plane in the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side.

The second lens unit G2 includes a negative meniscus lens L4 having a convex surface directed toward the object side, a biconcave negative lens L5, a biconvex positive lens L6, and a negative meniscus lens L7 having a convex surface directed toward an image side.

The third lens unit G3 includes a biconvex positive lens L8, a negative meniscus lens L9 having a convex surface directed toward the object side, and a biconvex positive lens L10. Here, the negative meniscus lens L9 and the biconvex positive lens L10 are cemented. Moreover, the aperture stop S is disposed between the negative meniscus lens L7 and the biconvex positive lens L8.

The fourth lens unit G4 includes a biconcave negative lens L11 and a positive meniscus lens L12 having a convex surface directed toward the object side.

At the time of zooming from a wide angle end to a telephoto end, a distance between the first lens unit G1 and the second lens unit G2 widens, a distance between the second lens unit G2 and the third lens unit G3 narrows, and a distance between the third lens unit G3 and the fourth lens unit G4 fluctuates. The aperture stop S moves together with the third lens unit G3.

More elaborately, the first lens unit G1, after moving toward the image side, moves toward the object side. The second lens unit G2, after moving toward the image side, moves toward the object side. The third lens unit G3, after moving toward the object side, moves toward the image side, and thereafter, moves toward the object side. The fourth lens unit G4, after moving toward the object side, moves toward the image side, and thereafter, moves toward the object side.

The movement of the first lens unit G1 toward the image side is from the wide angle end up to an intermediate focal length state 1. Moreover, the movement of the second lens unit G2 toward the image side is from the wide angle end up to an intermediate focal length state 3. Furthermore, the movement of the third lens unit G3 toward the object side is from the wide angle end up to the intermediate focal length state 1, and from an intermediate focal length state 2 up to the telephoto end. The movement of the fourth lens unit G4 toward the object side is from the wide angle end up to the intermediate focal length state 1, and from the intermediate focal length state 2 up to the telephoto end.

An aspheric surface is provided to a total of six surfaces namely, both surfaces of the negative meniscus lens L5, both surfaces of the biconvex positive lens L8, and both surfaces of the positive meniscus lens L12.

Next, a zoom lens according an example 5 will be described below. FIG. 9A, FIG. 9B, FIG. 9C, FIG. 9D, and FIG. 9E are cross-sectional views along an optical axis showing an optical arrangement at the time of infinite object point focusing of the zoom lens according to the example 5. FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are aberration diagrams at the time of infinite object point focusing of the zoom lens according to the example 5.

The zoom lens according to the example 5, as shown in FIG. 9A, FIG. 9B, FIG. 9C, FIG. 9D, and FIG. 9E, includes in order from an object side, a first lens unit G1 having a positive refractive power, a second lens unit G2 having a negative refractive power, a third lens unit G3 having a positive refractive power, and a fourth lens unit G4 having a negative refractive power. Moreover, an aperture stop is disposed in the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side.

The second lens unit G2 includes a negative meniscus lens L4 having a convex surface directed toward the object side, a biconcave negative lens L5, a biconvex positive lens L6, and a negative meniscus lens L7 having a convex surface directed toward an image side.

The third lens unit G3 includes a biconvex positive lens L8, a negative meniscus lens L9 having a convex surface directed toward the object side, and a biconvex positive lens L10. Here, the negative meniscus lens L9 and the biconvex positive lens L10 are cemented. Moreover, the aperture stop S is disposed between the biconvex positive lens L8 and the negative meniscus lens L9.

The fourth lens unit G4 includes a negative meniscus lens L11 having a convex surface directed toward the object side and a negative meniscus lens L12 having a convex surface directed toward the object side.

At the time of zooming form a wide angle end to a telephoto end, a distance between the first lens unit G1 and the second lens unit G2 widens, a distance between the second lens unit G2 and the third lens unit G3 narrows, and a distance between the third lens unit G3 and the fourth lens unit G4 fluctuates. The aperture stop S moves together with the third lens unit G3.

More elaborately, the first lens unit G1, after moving toward the image side, moves toward the object side. The second lens unit G2, after moving toward the image side, moves toward the object side. The third lens unit G3, after moving toward the object side, moves toward the image side, and thereafter, moves toward the object side. The fourth lens unit G4, after moving toward the object side, moves toward the image side, and thereafter, moves toward the object side.

The movement of the first lens unit G1 toward the image side is from the wide angle end up to an intermediate focal length state 1. Moreover, the movement of the second lens unit G2 toward the image side is from the wide angle end up to an intermediate focal length state 3. Furthermore, the movement of the third lens unit G3 toward the object side is from the wide angle end up to an intermediate focal length state 2, and from the intermediate focal length state 3 up to the telephoto end. An amount of movement of the third lens unit G3 toward the image side is extremely minute. Moreover, the movement of the fourth lens unit G4 toward the object side is from the wide angle end up to the intermediate focal length state 1, and from the intermediate focal length state 3 up to the telephoto end.

An aspheric surface is provided to a total of six surfaces namely, both surfaces of the biconcave negative lens L5, both surfaces of the biconvex positive lens L8, and both surfaces of the negative meniscus lens L12.

Next, a zoom lens according to an example 6 will be described below. FIG. 11A, FIG. 11B, FIG. 11C, FIG. 11D, and FIG. 11E are cross-sectional views along an optical axis showing an optical arrangement at the time of infinite object point focusing of the zoom lens according to the example 6. FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L are aberration diagrams at the time of infinite object point focusing of the zoom lens according to the example 6.

The zoom lens according to the example 6, as shown in FIG. 11A, FIG. 11B, FIG. 11C, FIG. 11D, and FIG. 11E, includes in order from an object side, a first lens unit G1 having a positive refractive power, a second lens unit G2 having a negative refractive power, a third lens unit G3 having a positive refractive power, and a fourth lens unit G4 having a negative refractive power. Moreover, an aperture stop S is disposed between a location nearest to an image plane in the second lens unit G2 and a location nearest to an image plane in the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side.

The second lens unit G2 includes a negative meniscus lens L4 having a convex surface directed toward the object side, a biconcave negative lens L5, a positive meniscus lens L6 having a convex surface directed toward an image side, and a negative meniscus lens L7 having a convex surface directed toward the image side.

The third lens unit G3 includes a biconvex positive lens L8, a biconvex positive lens L9, a biconcave negative lens L10, and a biconvex positive lens L11. Here, the biconvex positive lens L9 and the biconcave negative lens L10 are cemented. Moreover, the aperture stop S is disposed between the negative meniscus lens L7 and the biconvex positive lens L8.

The fourth lens unit G4 includes a biconcave negative lens L12 and a positive meniscus lens L13 having a convex surface directed toward the object side.

At the time of zooming from a wide angle end to a telephoto end, a distance between the first lens unit G1 and the second lens unit G2 widens, a distance between the second lens unit G2 and the third lens unit G3 narrows, and a distance between the third lens unit G3 and the fourth lens unit G4 fluctuates. The aperture stop S moves together with the third lens unit G3.

More elaborately, the first lens unit G1, after moving toward the image side, moves toward the object side. The second lens unit G1, after moving toward the image side, moves toward the object side. The third lens unit G3 moves toward the object side. The fourth lens unit G4 moves toward the object side.

The movement of the first lens unit G1 toward the image side is from the wide angle end up to an intermediate focal length state 1. Moreover, the movement of the second lens unit G2 toward the image side is from the wide angle end up to an intermediate focal length state 2.

An aspheric surface is provided to a total of nine surfaces namely, both surfaces of the biconcave negative lens L5, an image-side surface of the negative meniscus lens L7, both surfaces of the biconvex positive lens L8, both surfaces of the biconvex positive lens L11, and both surfaces of the positive meniscus lens L13.

Next, a zoom lens according to an example 7 ill be described below. FIG. 13A, FIG. 13B, FIG. 13C, FIG. 13D, and FIG. 13E are cross-sectional views along an optical axis showing an optical arrangement at the time of infinite object point focusing of the zoom lens according to the example 7. FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L are aberration diagrams at the time of infinite object point focusing of the zoom lens according to the example 7.

The zoom lens according to the example 7, as shown in FIG. 13A, FIG. 13B, FIG. 13C, FIG. 13D, and FIG. 13E, includes in order from an object side, a first lens unit G1 having a positive refractive power, a second lens unit G2 having a negative refractive power, a third lens unit G3 having a positive refractive power, and a fourth lens unit G4 having a negative refractive power. Moreover, an aperture stop S is disposed between a location nearest to an image plane in the second lens unit G2 and a location nearest to an image plane in the third lens unit G3.

The first lens unit G1 includes a negative meniscus lens L1 having a convex surface directed toward the object side, a biconvex positive lens L2, and a positive meniscus lens L3 having a convex surface directed toward the object side. Here, the negative meniscus lens L1 and the biconvex positive lens L2 are cemented.

The second lens unit G2 includes a negative meniscus lens L4 having a convex surface directed toward the object side, a negative meniscus lens L5 having a convex surface directed toward the object side, a biconvex positive lens L6, and a negative meniscus lens L7 having a convex surface directed toward an image side.

The third lens unit G3 includes a biconvex positive lens L8, a biconvex positive lens L9, a biconcave negative lens L10, and a biconvex positive lens L11. Here, the biconvex positive lens L9 and the biconcave negative lens L10 are cemented. Moreover, the aperture stop S is disposed between the negative meniscus lens L7 and the biconvex positive lens L8.

The fourth lens unit G4 includes a negative meniscus lens L12 having a convex surface directed toward the object side, and a positive meniscus lens L13 having a convex surface directed toward the object side.

At the time of zooming from a wide angle end to a telephoto end, a distance between the first lens unit G1 and the second lens unit G2 widens, a distance between the second lens unit G2 and the third lens unit G3 narrows, and a distance between the third lens unit G3 and the fourth lens unit G4 fluctuates. The aperture stop S moves together with the third lens unit G3.

More elaborately, the first lens unit G1, after moving toward the image side, moves toward the object side. The second lens unit G2, after moving toward the image side, moves toward the object side, and thereafter, moves toward the image side. The third lens unit G3 moves toward the object side. The fourth lens unit G4, after moving toward the image side, moves toward the object side.

The movement of the first lens unit G1 toward the image side is from the wide angle end up to an intermediate focal length state 1. Moreover, the movement of the second lens unit G2 toward the image side is from the wide angle end up to the intermediate focal length state 1, and from an intermediate focal length state 3 up to the telephoto end. Moreover, the movement of the fourth lens unit G4 toward the image side is from the wide angle end up to an intermediate focal length state 2.

An aspheric surface is provided to a total of nine surfaces namely, both surfaces of the negative meniscus lens L5, an image-side surface of the negative meniscus lens L7, both surfaces of the biconvex positive lens L8, both surfaces of the biconvex positive lens L11, and both surfaces of the positive meniscus lens L13.

Next, numerical data of optical components comprising the zoom lens of each above example are shown. In numerical data of each example, r1, r2, . . . denotes a curvature radius of each lens surface, d1, d2, . . . denotes a thickness of each lens or an air distance between adjacent lens surfaces, nd1, nd2, . . . denotes a refractive index of each lens for d-line, ν1, νd2, . . . denotes an Abbe number of each lens, * denotes an aspheric surface. Moreover, in the zoom data, WE denotes a wide angle end ST1 denotes an intermediate focal length state 1, ST2 denotes an intermediate focal length state 2, ST3 denotes an intermediate focal length state 3, TE denotes a telephoto end, focal length stands for a focal length of a total optical system of the zoom lens, FNO. denotes an F number, ω denotes a half angle of view, fb denotes a back focus, f1, f2 . . . is a focal length of each lens unit. The total length is the distance from the frontmost lens surface to the rearmost lens surface plus back focus. Further, fb (back focus) is a unit which is expressed upon air conversion of a distance from the lens backmost surface to a paraxial image surface.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, $$Z=(y^2/r)/[1+\{1-(1+k)(y/r)^2\}^{1/2}]+A4y^4+A6y^6+A8y^8+A10y^{10}$$

Further, in the aspherical surface coefficients, 'e-n' (where, n is an integral number) indicates '$10^{-n}$'. Moreover, these symbols are commonly used in the following numerical data for each example.

EXAMPLE 1

Unit mm

Surface data

| Surface no. | r | d | nd | vd |
|---|---|---|---|---|
| Object plane | ∞ | ∞ | | |
| 1 | 72.032 | 1.10 | 2.00069 | 25.46 |
| 2 | 41.649 | 0.11 | | |
| 3 | 41.520 | 4.81 | 1.49700 | 81.61 |
| 4 | −351.575 | 0.10 | | |
| 5 | 27.472 | 3.78 | 1.72916 | 54.68 |
| 6 | 80.000 | (Variable) | | |
| 7 | 155.813 | 0.90 | 1.91082 | 35.25 |
| 8 | 10.390 | 5.05 | | |
| 9* | 330.772 | 0.80 | 1.85135 | 40.10 |
| 10* | 26.166 | 0.62 | | |
| 11 | 42.148 | 2.40 | 1.95906 | 17.47 |
| 12 | −47.963 | 0.33 | | |
| 13 | −45.405 | 0.80 | 1.85135 | 40.10 |
| 14* | −176.808 | (Variable) | | |
| 15(Stop) | ∞ | 1.00 | | |
| 16* | 8.128 | 3.32 | 1.58313 | 59.38 |
| 17* | −53.435 | 0.22 | | |
| 18 | 26.421 | 1.44 | 1.49700 | 81.61 |
| 19 | −45.343 | 0.80 | 1.88300 | 40.76 |
| 20 | 7.739 | 1.12 | | |
| 21* | 10.233 | 3.65 | 1.49700 | 81.61 |
| 22* | −12.827 | (Variable) | | |
| 23 | −262.263 | 0.80 | 1.74100 | 52.64 |
| 24 | 11.953 | 1.23 | | |
| 25* | 11.852 | 1.46 | 1.52542 | 55.78 |
| 26* | 19.596 | (Variable) | | |
| 27 | ∞ | 2.66 | 1.51633 | 64.14 |
| 28 | ∞ | 1.00 | | |
| Image plane (Image pickup surface) | ∞ | | | |

Aspherical surface data

9th surface k = 0.000
A4 = −3.12993e−04, A6 = 2.62518e−06, A8 = −2.13001e−08,
A10 = 5.04146e−11

10th surface k = 0.000
A4 = −2.93713e−04, A6 = 3.06900e−06, A8 = −2.67107e−08,
A10 = 1.05948e−10

14th surface k = 0.000
A4 = −5.27708e−05, A6 = 8.61739e−08

16th surface k = −0.635
A4 = 6.37055e−05, A6 = 5.99251e−07, A8 = 8.04546e−09

17th surface k = 0.000
A4 = 1.39205e−04, A6 = −9.24474e−07

21th surface k = 0.000
A4 = −5.47595e−05, A6 = −4.65279e−07, A8 = 6.94184e−09

22th surface k = 0.000
A4 = 8.98292e−05, A6 = 2.54410e−07, A8 = 2.15866e−08

25th surface k = 0.000
A4 = −1.98813e−05, A6 = −1.62526e−07, A8 = −4.76192e−09

26th surface k = 0.000
A4 = −3.44458e−05, A6 = 1.54369e−07

Zoom data
Zoom ratio 6.87

| | WE | ST1 | ST2 | ST3 | TE |
|---|---|---|---|---|---|
| Focal length | 14.24 | 23.01 | 37.51 | 60.46 | 97.85 |

-continued

Unit mm

| Fno. | 3.92 | 4.71 | 5.19 | 5.16 | 6.42 |
|---|---|---|---|---|---|
| Angle of view 2ω | 85.706 | 52.466 | 32.317 | 20.150 | 12.644 |
| Image height | 11.15 | 11.15 | 11.15 | 11.15 | 11.15 |
| fb (in air) | 18.06 | 22.90 | 24.01 | 24.41 | 37.54 |
| Lens total length (in air) | 82.71 | 80.71 | 82.62 | 87.25 | 99.08 |
| d6 | 0.50 | 3.09 | 9.54 | 18.02 | 21.80 |
| d14 | 24.72 | 14.59 | 7.47 | 3.61 | 1.50 |
| d22 | 3.60 | 4.30 | 5.77 | 5.37 | 2.40 |
| d26 | 15.29 | 20.12 | 21.21 | 21.60 | 34.79 |

Unit focal length f1 = 47.34  f2 = −12.42  f3 = 15.05  f4 = −21.56

EXAMPLE 2

Unit mm

Surface data

| Surface no. | r | d | nd | νd |
|---|---|---|---|---|
| Object plane | ∞ | ∞ | | |
| 1 | 38.008 | 1.40 | 1.84666 | 23.78 |
| 2 | 28.779 | 0.10 | | |
| 3 | 28.768 | 7.64 | 1.49700 | 81.61 |
| 4 | 256.188 | 0.10 | | |
| 5 | 35.694 | 3.26 | 1.64000 | 60.08 |
| 6 | 100.342 | (Variable) | | |
| 7 | 128.319 | 0.80 | 1.91082 | 35.25 |
| 8 | 11.417 | 5.40 | | |
| 9* | 282.386 | 0.90 | 1.85135 | 40.10 |
| 10 | 95.936 | 2.71 | 1.94595 | 17.98 |
| 11 | −26.560 | 0.80 | 1.86400 | 40.58 |
| 12* | 64.586 | (Variable) | | |
| 13(Stop) | ∞ | 1.00 | | |
| 14* | 10.591 | 4.09 | 1.58313 | 59.38 |
| 15 | −84.334 | 2.54 | | |
| 16 | 19.558 | 1.75 | 1.49700 | 81.61 |
| 17 | −21.089 | 0.80 | 1.90366 | 31.32 |
| 18 | 10.407 | 1.38 | | |
| 19 | 13.255 | 2.14 | 1.80610 | 40.92 |
| 20* | −42.056 | (Variable) | | |
| 21 | −2099.168 | 0.80 | 1.69680 | 55.53 |
| 22 | 13.743 | 2.00 | | |
| 23* | 18.865 | 1.62 | 1.52542 | 55.78 |
| 24 | 64.303 | (Variable) | | |
| 25 | ∞ | 2.66 | 1.51633 | 64.14 |
| 26 | ∞ | 1.00 | | |
| Image plane (Image pickup surface) | ∞ | | | |

Aspherical surface data

9th surface k = 0.000
A4 = −1.09530e−04, A6 = −2.91177e−07, A8 = 5.65193e−10

12th surface k = 0.000
A4 = −1.29027e−04, A6 = −5.97794e−08, A8 = 1.59623e−09

14th surface k = −0.399
A4 = −1.13338e−05, A6 = 2.04570e−07, A8 = −3.24281e−09

20th surface

-continued

Unit mm k = 0.000
A4 = 9.21418e−05, A6 = 4.18410e−07, A8 = 2.17524e−09

23th surface k = 0.000
A4 = 2.08035e−05, A6 = −1.68061e−08, A8 = −5.09840e−10

Zoom data
Zoom ratio 6.90

| | WE | ST1 | ST2 | ST3 | TE |
|---|---|---|---|---|---|
| Focal length | 14.91 | 23.85 | 38.75 | 62.60 | 102.85 |
| Fno. | 5.00 | 5.77 | 6.00 | 6.14 | 6.42 |
| Angle of view 2ω | 82.795 | 51.221 | 31.402 | 19.474 | 11.941 |
| Image height | 11.15 | 11.15 | 11.15 | 11.15 | 11.15 |
| fb (in air) | 20.24 | 23.56 | 21.82 | 21.48 | 30.05 |
| Lens total length (in air) | 91.35 | 88.81 | 90.39 | 92.66 | 99.10 |
| d6 | 0.50 | 3.68 | 11.24 | 18.08 | 24.32 |
| d12 | 27.37 | 16.79 | 9.82 | 4.51 | 1.50 |
| d20 | 2.00 | 3.56 | 6.28 | 7.36 | 2.00 |
| d24 | 17.47 | 20.78 | 19.04 | 18.71 | 27.27 |

Unit focal length f1 = 51.00   f2 = −12.08   f3 = 16.64   f4 = −33.87

EXAMPLE 3

Unit mm

Surface data

| Surface no. | r | d | nd | νd |
|---|---|---|---|---|
| Object plane | ∞ | ∞ | | |
| 1 | 74.811 | 1.10 | 2.00069 | 25.46 |
| 2 | 42.114 | 0.10 | | |
| 3 | 41.822 | 4.69 | 1.49700 | 81.61 |
| 4 | −367.693 | 0.10 | | |
| 5 | 26.766 | 3.77 | 1.72916 | 54.68 |
| 6 | 80.000 | (Variable) | | |
| 7* | −174.338 | 0.70 | 1.86400 | 40.58 |
| 8* | 12.281 | 6.54 | | |
| 9* | −18.021 | 0.70 | 1.86400 | 40.58 |
| 10* | −179.626 | 0.10 | | |
| 11 | 39.689 | 2.19 | 1.95906 | 17.47 |
| 12 | −71.059 | (Variable) | | |
| 13(Stop) | ∞ | 1.00 | | |
| 14* | 9.232 | 3.49 | 1.59201 | 67.02 |
| 15* | −69.210 | 1.19 | | |
| 16 | 79.460 | 0.70 | 1.88300 | 40.76 |
| 17 | 6.927 | 4.47 | 1.55332 | 71.68 |
| 18* | −13.308 | (Variable) | | |
| 19 | −69.413 | 0.70 | 1.64000 | 60.08 |
| 20 | 10.866 | 1.95 | | |
| 21* | 14.000 | 1.25 | 1.52542 | 55.78 |
| 22* | 22.894 | (Variable) | | |
| 23 | ∞ | 2.66 | 1.51633 | 64.14 |
| 24 | ∞ | 1.00 | | |
| Image plane (Image pickup surface) | ∞ | | | |

Aspherical surface data

7th surface k = 0.000
A4 = 5.89010e−05, A6 = −2.19487e−07, A8 = 5.14664e−10

-continued

| Unit mm |
|---|

8th surface k = 0.000
A4 = 7.65701e−06, A6 = 2.86534e−07, A8 = −1.20402e−09
9th surface k = 0.000
A4 = −8.96556e−05, A6 = 6.07946e−07
10th surface k = 0.000
A4 = −4.04053e−05, A6 = 7.63189e−07
14th surface k = −0.625
A4 = 5.87400e−05, A6 = 5.05523e−07, A8 = 1.14858e−08
15th surface k = 0.000
A4 = 1.88528e−04, A6 = −4.65834e−07
18th surface k = 0.000
A4 = 4.50775e−05, A6 = 3.33490e−07
21th surface k = 0.000
A4 = 2.57676e−06, A6 = 8.80700e−08
22th surface k = 0.000
A4 = −5.00000e−05, A6 = −7.00000e−08

Zoom data
Zoom ratio 6.88

| | WE | ST1 | ST2 | ST3 | TE |
|---|---|---|---|---|---|
| Focal length | 14.60 | 23.58 | 38.19 | 61.84 | 100.45 |
| Fno. | 4.01 | 4.99 | 5.33 | 5.29 | 6.42 |
| Angle of view 2ω | 84.029 | 51.812 | 31.818 | 19.708 | 12.338 |
| Image height | 11.15 | 11.15 | 11.15 | 11.15 | 11.15 |
| fb (in air) | 18.55 | 24.63 | 24.76 | 25.36 | 39.54 |
| Lens total length (in air) | 82.66 | 78.49 | 79.77 | 85.47 | 99.08 |
| d6 | 0.50 | 1.00 | 7.91 | 17.09 | 20.90 |
| d12 | 25.46 | 14.00 | 6.68 | 3.21 | 1.50 |
| d18 | 3.41 | 4.12 | 5.67 | 5.07 | 2.40 |
| d22 | 15.80 | 21.88 | 22.00 | 22.61 | 36.79 |

Unit focal length

| f1 = 46.63 | f2 = −12.62 | f3 = 14.23 | f4 = −19.14 |
|---|---|---|---|

EXAMPLE 4

| Unit mm |
|---|

Surface data

| Surface no. | r | d | nd | vd |
|---|---|---|---|---|
| Object plane | ∞ | ∞ | | |
| 1 | 64.000 | 1.20 | 2.00069 | 25.46 |
| 2 | 34.022 | 0.30 | | |
| 3 | 35.477 | 3.76 | 1.72916 | 54.68 |
| 4 | 149.743 | 0.10 | | |
| 5 | 28.699 | 3.64 | 1.72916 | 54.68 |
| 6 | 97.637 | (Variable) | | |
| 7 | 41.795 | 0.90 | 2.00330 | 28.27 |
| 8 | 10.247 | 5.26 | | |
| 9* | −22.715 | 0.80 | 1.85135 | 40.10 |
| 10* | 198.558 | 0.11 | | |
| 11 | 31.900 | 2.83 | 1.94595 | 17.98 |
| 12 | −27.035 | 0.60 | | |
| 13 | −19.811 | 0.80 | 1.88300 | 40.76 |
| 14 | −128.044 | (Variable) | | |
| 15(Stop) | ∞ | 1.00 | | |
| 16* | 10.460 | 2.60 | 1.58313 | 59.38 |
| 17* | −37.577 | 2.27 | | |
| 18 | 48.553 | 0.80 | 1.91082 | 35.25 |
| 19 | 7.732 | 3.82 | 1.49700 | 81.61 |
| 20 | −18.209 | (Variable) | | |
| 21 | −59.599 | 0.80 | 1.49700 | 81.61 |
| 22 | 12.676 | 1.30 | | |
| 23* | 18.368 | 1.80 | 1.52542 | 55.78 |
| 24* | 58.363 | (Variable) | | |
| 25 | ∞ | 2.66 | 1.51633 | 64.14 |
| 26 | ∞ | 1.00 | | |
| Image plane (Image pickup surface) | ∞ | | | |

Aspherical surface data

9th surface k = 0.000
A4 = −1.47793e−04, A6 = 1.08021e−06, A8 = 7.44511e−09,
A10 = −8.50234e−11
10th surface k = 0.000
A4 = −1.39618e−04, A6 = 1.47173e−06, A8 = 2.74729e−09,
A10 = −5.56801e−11
16th surface k = −0.234
A4 = −4.39040e−05, A6 = 1.99715e−07, A8 = 1.37060e−09
17th surface k = 0.000
A4 = 8.90177e−05, A6 = 4.69065e−08
23th surface k = 0.000
A4 = 4.76840e−05, A6 = 1.55434e−07, A8 = 2.90532e−09
24th surface k = 0.000
A4 = 2.00000e−05, A6 = −2.00000e−09

Zoom data
Zoom ratio 6.90

| | WE | ST1 | ST2 | ST3 | TE |
|---|---|---|---|---|---|
| Focal length | 14.63 | 23.41 | 38.05 | 61.46 | 100.97 |
| Fno. | 4.55 | 5.44 | 5.36 | 5.52 | 6.42 |
| Angle of view 2ω | 83.672 | 52.176 | 31.826 | 19.824 | 12.217 |
| Image height | 11.15 | 11.15 | 11.15 | 11.15 | 11.15 |
| fb (in air) | 25.10 | 27.05 | 19.41 | 19.56 | 32.25 |
| Lens total length (in air) | 86.86 | 82.54 | 84.60 | 89.51 | 99.08 |
| d6 | 0.50 | 1.46 | 11.32 | 18.90 | 23.56 |
| d14 | 24.55 | 13.76 | 7.68 | 3.98 | 1.52 |
| d20 | 2.00 | 5.56 | 11.50 | 12.38 | 7.04 |
| d24 | 22.35 | 24.30 | 16.66 | 16.80 | 29.50 |

Unit focal length

| f1 = 49.59 | f2 = −10.83 | f3 = 16.13 | f4 = −37.05 |
|---|---|---|---|

EXAMPLE 5

Unit mm
Surface data

| Surface no. | r | d | nd | vd |
|---|---|---|---|---|
| Object plane | ∞ | ∞ | | |
| 1 | 64.000 | 1.20 | 2.00069 | 25.46 |
| 2 | 33.967 | 0.19 | | |
| 3 | 34.396 | 4.39 | 1.72916 | 54.68 |
| 4 | 184.892 | 0.10 | | |
| 5 | 29.656 | 4.02 | 1.72916 | 54.68 |
| 6 | 101.538 | (Variable) | | |
| 7 | 88.013 | 0.90 | 2.00330 | 28.27 |
| 8 | 10.850 | 5.56 | | |
| 9* | −29.270 | 0.80 | 1.85135 | 40.10 |
| 10* | 93.479 | 0.28 | | |
| 11 | 29.867 | 3.43 | 1.94595 | 17.98 |
| 12 | −32.003 | 0.93 | | |
| 13 | −20.444 | 0.80 | 1.88300 | 40.76 |
| 14 | −99.281 | (Variable) | | |
| 15* | 12.424 | 3.21 | 1.58313 | 59.38 |
| 16* | −38.680 | 1.50 | | |
| 17(Stop) | ∞ | 1.50 | | |
| 18 | 100.000 | 0.80 | 1.91082 | 35.25 |
| 19 | 9.831 | 3.59 | 1.49700 | 81.61 |
| 20 | −14.656 | (Variable) | | |
| 21 | 244.294 | 0.80 | 1.49700 | 81.61 |
| 22 | 27.928 | 0.82 | | |
| 23* | 315.775 | 1.00 | 1.52542 | 55.78 |
| 24* | 58.363 | (Variable) | | |
| 25 | ∞ | 2.66 | 1.51633 | 64.14 |
| 26 | ∞ | 1.00 | | |
| Image plane (Image pickup surface) | ∞ | | | |

Aspherical surface data

9th surface k = 0.000
A4 = −6.93233e−06, A6 = −1.39005e−07, A8 = −1.58443e−08,
A10 = 1.48511e−10

10th surface k = 0.000
A4 = −1.49162e−05, A6 = −6.20458e−08, A8 = −1.48805e−08,
A10 = 1.48656e−10

15th surface k = −0.097
A4 = −3.22300e−05, A6 = 2.95457e−07, A8 = 1.77794e−09

16th surface k = 0.000
A4 = 9.64024e−05, A6 = 2.74474e−07

23th surface k = 0.000
A4 = −2.57353e−05, A6 = −9.08914e−09, A8 = 3.24006e−09

24th surface k = 0.000
A4 = −2.00000e−05, A6 = −4.00000e−08

Zoom data
Zoom ratio 6.89

| | WE | ST1 | ST2 | ST3 | TE |
|---|---|---|---|---|---|
| Focal length | 14.86 | 23.78 | 38.65 | 62.43 | 102.47 |
| Fno. | 4.35 | 4.45 | 4.97 | 5.03 | 6.42 |
| Angle of view 2ω | 83.062 | 51.214 | 31.453 | 9.536 | 11.987 |
| Image height | 11.15 | 11.15 | 11.15 | 11.15 | 11.15 |
| fb (in air) | 27.11 | 28.19 | 23.67 | 19.70 | 30.71 |

-continued

Unit mm

| | | | | | |
|---|---|---|---|---|---|
| Lens total length (in air) | 88.77 | 86.62 | 88.63 | 92.11 | 99.10 |
| d6 | 0.50 | 2.97 | 9.34 | 17.05 | 22.49 |
| d14 | 23.34 | 13.66 | 7.21 | 2.97 | 0.50 |
| d20 | 2.00 | 5.99 | 12.59 | 16.57 | 9.58 |
| d24 | 24.36 | 25.43 | 20.89 | 16.89 | 27.94 |

Unit focal length

| f1 = 47.45 | f2 = −10.37 | f3 = 17.13 | f4 = −43.01 |
|---|---|---|---|

EXAMPLE 6

Unit mm
Surface data

| Surface no. | r | d | nd | vd |
|---|---|---|---|---|
| Object plane | ∞ | ∞ | | |
| 1 | 60.232 | 1.10 | 2.00069 | 25.46 |
| 2 | 34.969 | 0.10 | | |
| 3 | 34.887 | 4.32 | 1.49700 | 81.61 |
| 4 | 158.502 | 0.10 | | |
| 5 | 20.371 | 4.58 | 1.72916 | 54.68 |
| 6 | 80.000 | (Variable) | | |
| 7 | 102.726 | 0.90 | 1.91082 | 35.25 |
| 8 | 10.686 | 5.01 | | |
| 9* | −1913.798 | 0.80 | 1.85135 | 40.10 |
| 10* | 51.268 | 0.53 | | |
| 11 | −138.324 | 2.34 | 1.95906 | 17.47 |
| 12 | −20.522 | 0.68 | | |
| 13 | −17.122 | 0.80 | 1.85135 | 40.10 |
| 14* | −42.609 | (Variable) | | |
| 15(Stop) | ∞ | 1.00 | | |
| 16* | 7.747 | 3.19 | 1.58313 | 59.38 |
| 17* | −84.156 | 0.10 | | |
| 18 | 20.586 | 1.75 | 1.49700 | 81.61 |
| 19 | −51.172 | 0.81 | 1.88300 | 40.76 |
| 20 | 7.424 | 0.68 | | |
| 21* | 9.251 | 6.19 | 1.49700 | 81.61 |
| 22* | −9.712 | (Variable) | | |
| 23 | −18.929 | 0.80 | 1.74100 | 52.64 |
| 24 | 19.581 | 0.50 | | |
| 25* | 47.775 | 1.13 | 1.52542 | 55.78 |
| 26* | 75.252 | (Variable) | | |
| 27 | ∞ | 2.66 | 1.51633 | 64.14 |
| 28 | ∞ | 1.00 | | |
| Image plane (Image pickup surface) | ∞ | | | |

Aspherical surface data

9th surface k = 0.000
A4 = −3.12345e−04, A6 = 3.84824e−06, A8 = −1.14847e−08,
A10 = −1.17069e−10

10th surface k = 0.000
A4 = −2.89644e−04, A6 = 4.66501e−06, A8 = −1.46745e−08,
A10 = −7.72838e−11

14th surface k = 0.000
A4 = −4.73007e−05, A6 = −5.26587e−07

16th surface k = −0.650

-continued

Unit mm

A4 = 6.77236e−05, A6 = 3.86735e−07, A8 = 1.27396e−08
17th surface k = 0.000
A4 = 1.16967e−04, A6 = −6.12108e−07
21th surface k = 0.000
A4 = −1.41517e−04, A6 = −6.05812e−08, A8 = 2.63013e−08
22th surface k = 0.000
A4 = 2.73725e−04, A6 = −1.77222e−07, A8 = 5.73790e−08
25th surface k = 0.000
A4 = 1.42863e−04, A6 = −1.54957e−06, A8 = 2.13922e−08
26th surface k = 0.000
A4 = −3.96541e−05, A6 = −5.00000e−08

Zoom data
Zoom ratio 3.99

|  | WE | ST1 | ST2 | ST3 | TE |
|---|---|---|---|---|---|
| Focal length | 14.55 | 20.14 | 28.60 | 40.23 | 58.07 |
| Fno. | 3.58 | 4.16 | 4.47 | 5.30 | 6.42 |
| Angle of view 2ω | 84.621 | 59.179 | 41.621 | 29.920 | 21.023 |
| Image height | 11.15 | 11.15 | 11.15 | 11.15 | 11.15 |
| fb (in air) | 9.63 | 12.59 | 14.42 | 19.11 | 25.72 |
| Lens total length (in air) | 70.15 | 67.72 | 70.16 | 72.32 | 77.12 |
| d6 | 0.50 | 1.23 | 5.43 | 6.85 | 8.53 |
| d14 | 17.97 | 11.72 | 8.27 | 4.55 | 1.50 |
| d22 | 4.64 | 4.76 | 4.63 | 4.39 | 3.96 |
| d26 | 6.84 | 9.80 | 11.62 | 16.32 | 22.94 |

Unit focal length

| f1 = 37.85 | f2 = −12.08 | f3 = 13.41 | f4 = −13.56 |
|---|---|---|---|

EXAMPLE 7

Unit mm

Surface data

| Surface no. | r | d | nd | vd |
|---|---|---|---|---|
| Object plane | ∞ | ∞ | | |
| 1 | 106.124 | 0.80 | 2.00069 | 25.46 |
| 2 | 58.513 | 3.90 | 1.49700 | 81.61 |
| 3 | −163.590 | 0.10 | | |
| 4 | 46.549 | 2.53 | 1.72916 | 54.68 |
| 5 | 183.798 | (Variable) | | |
| 6 | 206.499 | 0.90 | 1.91082 | 35.25 |
| 7 | 13.421 | 7.11 | | |
| 8* | 370.353 | 0.80 | 1.85135 | 40.10 |
| 9* | 22.642 | 0.84 | | |
| 10 | 54.879 | 2.45 | 1.95906 | 17.47 |
| 11 | −42.769 | 0.55 | | |
| 12 | −43.169 | 0.80 | 1.80610 | 40.92 |
| 13* | −593.147 | (Variable) | | |
| 14(Stop) | ∞ | 1.00 | | |
| 15* | 13.460 | 3.61 | 1.58313 | 59.38 |
| 16* | −84.873 | 3.93 | | |
| 17 | 59.664 | 1.83 | 1.49700 | 81.61 |
| 18 | −28.421 | 0.80 | 1.91082 | 35.25 |
| 19 | 14.228 | 0.42 | | |
| 20* | 14.981 | 3.30 | 1.58313 | 59.38 |

-continued

Unit mm

| 21* | −20.665 | (Variable) | | |
|---|---|---|---|---|
| 22 | 112.000 | 0.80 | 1.65160 | 58.55 |
| 23 | 15.437 | 1.46 | | |
| 24* | 19.773 | 3.14 | 1.52542 | 55.78 |
| 25* | 70.000 | (Variable) | | |
| 26 | ∞ | 2.66 | 1.51633 | 64.14 |
| 27 | ∞ | 1.00 | | |
| Image plane (Image pickup surface) | ∞ | | | |

Aspherical surface data

8th surface k = 0.000
A4 = −2.74204e−04, A6 = 1.01592e−06, A8 = −4.56439e−09

9th surface k = 0.000
A4 = −2.11236e−04, A6 = 7.19955e−07, A8 = −2.98226e−09

13th surface k = 0.000
A4 = −8.01945e−05, A6 = 4.90205e−07

15th surface k = −0.897
A4 = 2.86935e−05, A6 = 4.98253e−08, A8 = −1.30933e−10

16th surface k = 0.000
A4 = 3.08701e−05, A6 = −1.44923e−07

20th surface k = 0.000
A4 = −4.33016e−05, A6 = −1.41280e−07

21th surface k = 0.000
A4 = 1.98329e−05, A6 = 5.90870e−08

24th surface k = 0.000
A4 = 3.43015e−05, A6 = 1.85565e−07

25th surface k = 0.000
A4 = 2.56860e−05, A6 = 1.74457e−07

Zoom data
Zoom ratio 9.98

|  | WE | ST1 | ST2 | ST3 | TE |
|---|---|---|---|---|---|
| Focal length | 14.61 | 26.12 | 46.19 | 82.45 | 145.80 |
| Fno. | 4.56 | 5.14 | 6.29 | 6.42 | 6.42 |
| Angle of view 2ω | 83.575 | 47.148 | 26.426 | 14.847 | 8.445 |
| Image height | 11.15 | 11.15 | 11.15 | 11.15 | 11.15 |
| fb (in air) | 30.51 | 26.05 | 24.67 | 26.75 | 49.43 |
| Lens total length (in air) | 106.93 | 96.41 | 106.94 | 123.76 | 138.93 |
| d5 | 0.50 | 0.51 | 8.19 | 18.21 | 33.87 |
| d13 | 32.84 | 14.42 | 6.73 | 2.13 | 1.50 |
| d21 | 2.00 | 14.36 | 26.28 | 35.59 | 13.06 |
| d25 | 27.75 | 23.25 | 21.89 | 23.99 | 46.72 |

Unit focal length

| f1 = 64.07 | f2 = −12.53 | f3 = 21.71 | f4 = −61.05 |
|---|---|---|---|

Next, values of conditional expressions (1) to (16) in each example are given below. '-' (hyphen) indicates that there is no corresponding arrangement.

| Conditional expressions | Example 1 | Example 2 | Example 3 | Example 4 |
|---|---|---|---|---|
| (1) $\beta_{2t}/\beta_{3t}$ | 2.519 | 2.711 | 2.784 | 1.153 |
| (2) $\beta_{2w}/\beta_{3w}$ | 1.068 | 0.8856 | 1.231 | 0.6462 |
| (3) $\beta_{2t}/\beta_{2w}$ | 3.322 | 4.252 | 3.203 | 3.331 |
| (4) $\beta_{2t}$ | −1.354 | −1.649 | −1.363 | −1.095 |
| (5) $TL_t/f_t$ | 1.022 | 0.9725 | 0.9954 | 0.9902 |
| (6) $f_1/f_t$ | 0.4843 | 0.4960 | 0.4642 | 0.4911 |
| (7) $\beta_{4w}$ | 1.932 | 1.721 | 2.127 | 1.764 |
| (8) $|\Delta_{23}/\Delta_{12}|$ | 1.089 | 1.086 | 1.174 | 0.9986 |
| (9) $D_{3a\_max}/D_{3L-max}$ | 0.3075 | 0.6196 | 0.2659 | 0.5941 |
| (10) $D_{4a\_max}/D_{4L-sum}$ | 0.5458 | 0.8271 | 0.9995 | 0.5026 |
| (11) $|(r_{4f} + r_{4b})|/|(r_{4f} - r_{4b})|$ | 0.8609 | 0.9405 | 0.5039 | 0.0104 |
| (12) $|(r_{4ff} + r_{4fb})|/|(r_{4ff} - r_{4fb})|$ | 0.9128 | 0.9869 | 0.7292 | 0.6492 |
| (13) $|(r_{41f} + r_{41b})|/|(r_{41f} - r_{41b})|$ | 4.06 | 1.83 | 4.147 | 1.918 |
| (14) $(r_{2ff} + r_{2fb})/(r_{2ff} - r_{2fb})$ | 1.142 | 1.195 | 0.8683 | 1.649 |
| (15) $f_2/f_w$ | −0.8734 | −0.8105 | −0.8646 | −0.7402 |
| (16) $nd_{2ave}$ | 1.893 | 1.893 | 1.895 | 1.920 |

| Conditional expressions | Example 5 | Example 6 | Example 7 |
|---|---|---|---|
| (1) $\beta_{2t}/\beta_{3t}$ | 1.061 | 1.824 | 0.6597 |
| (2) $\beta_{2w}/\beta_{3w}$ | 0.5896 | 1.633 | 0.4808 |
| (3) $\beta_{2t}/\beta_{2w}$ | 3.436 | — | 3.381 |
| (4) $\beta_{2t}$ | −1.149 | −0.9655 | −0.8944 |
| (5) $TL_t/f_t$ | 0.9759 | 1.344 | 0.9590 |
| (6) $f_1/f_t$ | 0.4630 | 0.6524 | 0.4394 |
| (7) $\beta_{4w}$ | 1.651 | 1.814 | 1.567 |
| (8) $|\Delta_{23}/\Delta_{12}|$ | 1.038 | 2.051 | 0.9392 |
| (9) $D_{3a\_max}/D_{3L-max}$ | 0.8347 | 0.1094 | 1.088 |
| (10) $D_{4a\_max}/D_{4L-sum}$ | 0.4548 | 0.2565 | 0.3707 |
| (11) $|(r_{4f} + r_{4b})|/|(r_{4f} - r_{4b})|$ | 1.627 | 0.5980 | 4.333 |
| (12) $|(r_{4ff} + r_{4fb})|/|(r_{4ff} - r_{4fb})|$ | 1.258 | 0.0169 | 1.319 |
| (13) $|(r_{41f} + r_{41b})|/|(r_{41f} - r_{41b})|$ | 1.453 | 4.477 | 1.787 |
| (14) $(r_{2ff} + r_{2fb})/(r_{2ff} - r_{2fb})$ | 1.281 | 1.232 | 1.139 |
| (15) $f_2/f_w$ | −0.6979 | −0.8307 | −0.8578 |
| (16) $nd_{2ave}$ | 1.920 | 1.893 | 1.881 |

Figure 15:
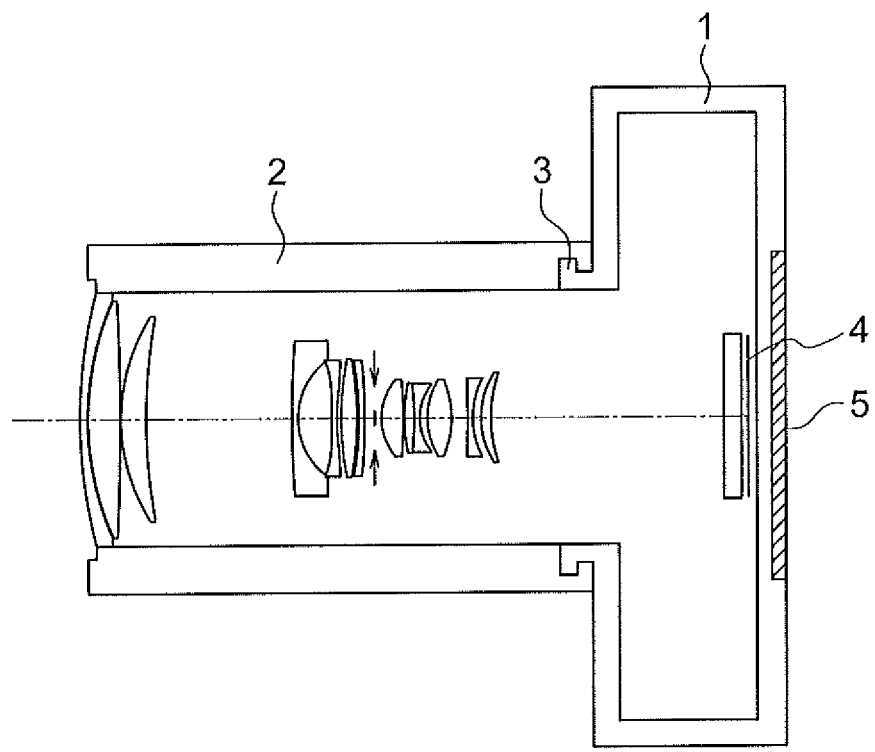
FIG. 15 is a cross-sectional view of an interchangeable lens camera in which, the zoom lens according to the present example is used as an interchangeable lens.

FIG. 15 is a cross-sectional view of a single-lens reflex camera as an electronic image pickup apparatus. In FIG. 15, a taking lens system 2 is disposed inside a lens barrel of a single-lens reflex camera 1. A mount portion 3 enables the taking lens system 2 to be detachable from a body of the single-lens reflex camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens reflex camera 1. As an image pickup element, an element such as a small-size CCD (charge coupled device) or a CMOS (complementary metal-oxide semiconductor) is to be used.

Moreover, as the taking lens system 2 of the single-lens reflex camera 1, the zoom lens described in any one of the examples from the first example to the seventh example is to be used for instance.

Figure 16:
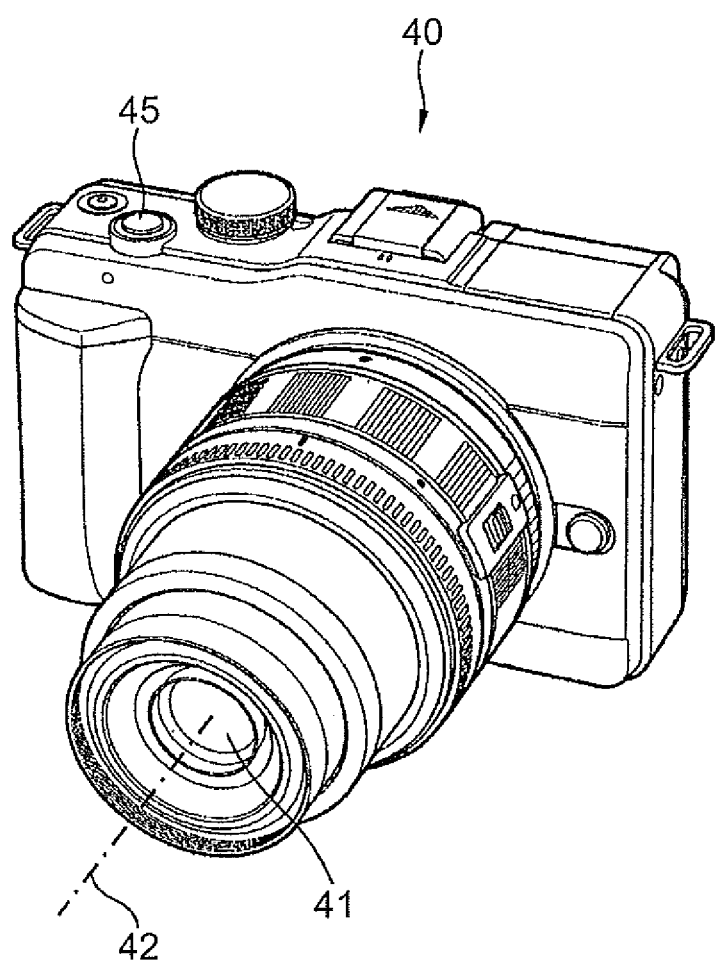
FIG. 16 is a front perspective view showing an appearance of the interchangeable lens camera according to the present example.
Figure 17:
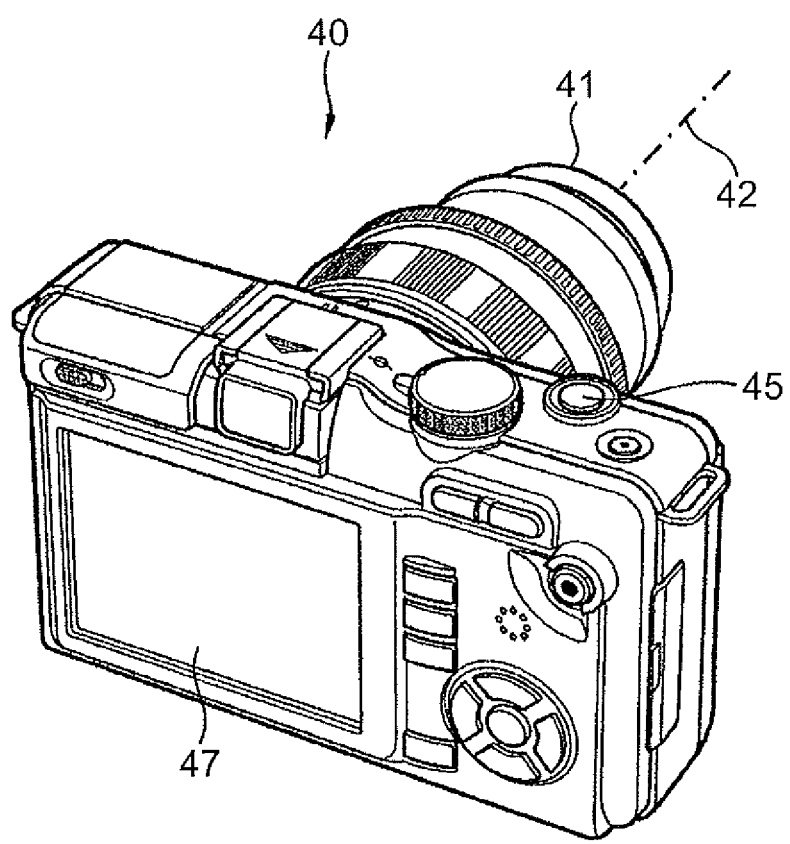
FIG. 17 is a rear perspective view of the interchangeable lens camera in FIG. 16.

FIG. 16 and FIG. 17 are conceptual diagrams of an arrangement of the image pickup apparatus having a zoom lens according to the present example. FIG. 16 is a front perspective view showing an appearance of a single-lens reflex camera 40 as the image pickup apparatus, and FIG. 17 is a rear perspective view of the single-lens reflex camera 40. The zoom lens according to the present example is used in a photographic optical system 41 of the single-lens reflex camera 40.

The single-lens reflex camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the zoom lens according to the first example, for instance. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a recording means.

Figure 18:
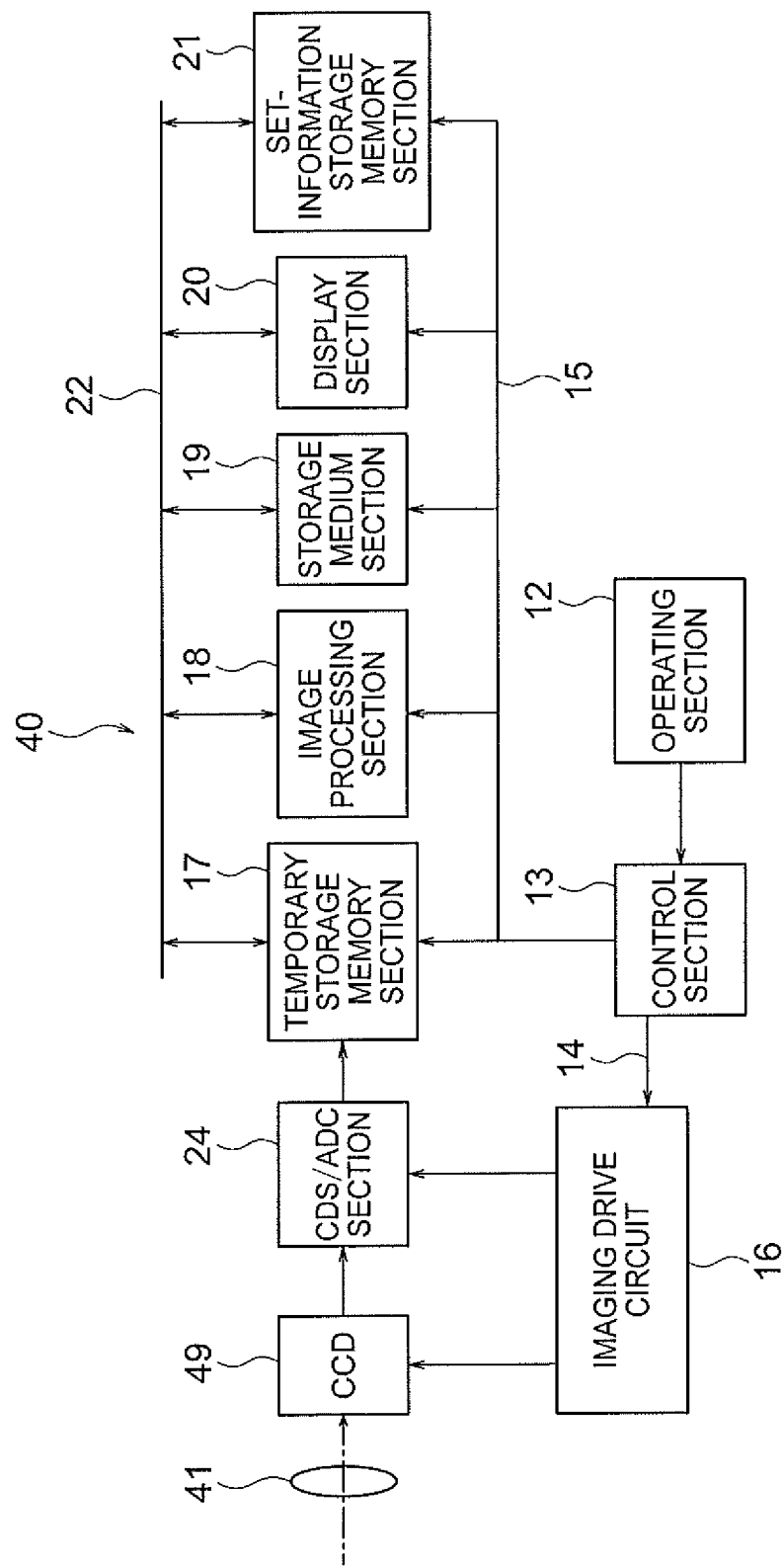
FIG. 18 is a block diagram of an internal circuit of main components of the interchangeable lens camera in FIG. 16.

FIG. 18 is a structural block diagram of an internal circuit of main components of the single-lens reflex camera 40. In the following description, the processing means described above includes for instance, a CDS/ADC section 24, a temporary storage memory 17, and an image processing section 18, and a storage means consists of a storage medium section 19 for example.

As shown in FIG. 18, the single-lens reflex camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire single-lens reflex camera 40 according to a computer program stored in this computer program memory.

The CCD 49 is driven and controlled by the imaging drive circuit 16, and which converts an amount of light for each pixel of the object image which formed through the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays images and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

It is possible to let the single-lens reflex camera 40 arranged in such manner to be an image pickup apparatus having a desired back focus, which is small-sized and with a large zooming ratio, and which has an improved optical performance in an entire zooming range.

The present invention can have various modified examples without departing from the scope of the invention. For example, in the example 3, the biconvex positive lens L6 may be divided in to two lenses. Moreover, the biconvex positive lens L6 may be let to be a cemented lens. In each example, the aperture stop S may be disposed at a different position in the third lens unit G3. Moreover, in each example, a height of a light ray being low in the fourth lens unit G4, an effect on an imaging performance is small. Therefore, a degree of freedom of designing being high, if a surface on the image side of the lens disposed nearest to the image is a surface having a convex surface directed toward the object side, it is possible to make an appropriate change in the design. For example, the fourth lens unit G4 may include in order from the object side, a lens having a positive refractive power, and a lens having a negative refractive power. Moreover, shapes and the number of lenses are not necessarily restricted to the shapes and the number of lenses described in each embodiment. In each example, the cover glass C may not be disposed necessarily. A lens which is not shown in the examples and which does not have a refractive power practically may be disposed in or outside each lens unit.

According to the present invention, it is possible to provide a zoom lens having a desired back focus, which is small-sized and with a large zooming ratio, and which has an improved optical performance in the entire zooming range, and an image pickup apparatus using such zoom lens.

As described heretofore, the present invention is suitable for a zoom lens having a desired back focus, which is small-sized and with a large zooming ratio, and which has an improved optical performance in the entire zooming range, and an image pickup apparatus using such zoom lens.

What is claimed is:

1. A zoom lens comprising in order from an object side to an image side:
    a first lens unit having a positive refractive power;
    a second lens unit having a negative refractive power;
    a third lens unit having a positive refractive power; and
    a fourth lens unit having a negative refractive power,
        wherein
    the fourth lens unit includes at least two lenses, and
    at the time of zooming from a wide angle end to a telephoto end,
    a distance between the first lens unit and the second lens unit widens,
    a distance between the second lens unit and the third lens unit narrows, and
    a distance between the third lens unit and the fourth lens unit fluctuates, and
    the total number of lens units included in the zoom lens is four, and
    the first lens unit, after moving toward the image side, moves toward the object side, wherein the following conditional expression (1) is satisfied:

$$0.65 < \beta_{2t}/\beta_{3t} < 5 \quad (1)$$

where,
$\beta_{2t}$ denotes a magnification of the second lens unit at the telephoto end, and
$\beta_{3t}$ denotes a magnification of the third lens unit at the telephoto end, and
each of $\beta_{2t}$ and $\beta_{3t}$ is a magnification when focused at an infinite object point.

2. The zoom lens according to claim 1, wherein
a movement of the second lens unit at the time of zooming from the wide angle end to the telephoto end includes at least a movement toward the image side, and thereafter, a movement toward the object side.

3. The zoom lens according to claim 1, wherein the following conditional expression (2) is satisfied:

$$0.48 < \beta_{2w}/\beta_{3w} < 2 \quad (2)$$

where,
$\beta_{2w}$ denotes a magnification of the second lens unit at the wide angle end, and
$\beta_{3w}$ denotes a magnification of the third lens unit at the wide angle end, and
each of $\beta_{2w}$ and $\beta_{3w}$ is a magnification when focused at an infinite object point.

4. The zoom lens according to claim 1, wherein the following conditional expression (5) is satisfied:

$$0.8 < TL_t/f_t < 1.5 \quad (5)$$

where,
$TL_t$ denotes a total length of the overall zoom lens system at the telephoto end, and is a total length when focused at an infinite object point, and
$f_t$ denotes a focal length of the overall zoom lens system at the telephoto end.

5. The zoom lens according to claim 1, wherein the following conditional expression (7) is satisfied:

$$1.4 < \beta_{4w} < 3 \quad (7)$$

where,
$\beta_{4w}$ denotes a magnification of the fourth lens unit at the telephoto end, and is a magnification when focused at an infinite object point.

6. The zoom lens according to claim 1, comprising:
an aperture stop which is disposed between a location nearest to an image plane in the second lens unit and a location nearest to an image plane in the third lens unit, wherein
the aperture stop moves together with the third lens unit.

7. The zoom lens according to claim 1, wherein the following conditional expression (8) is satisfied:

$$0.77 < |\Delta_{23}/\Delta_{12}| < 2.5 \quad (8)$$

where,
$\Delta 12 = D_{12W} - D_{12T}$, $\Delta_{23} = D_{23W} - D_{23T}$, $D_{12W}$ denotes a distance between the first lens unit and the second lens unit at the wide angle end, $D_{12T}$ denotes a distance between the first lens unit and the second lens unit at the telephoto end, $D_{23W}$ denotes a distance between the second lens unit and the third lens unit at the wide angle end, and $D_{23T}$ denotes a distance between the second lens unit and the third lens unit at the telephoto end.

8. The zoom lens according to claim 1, wherein the conditional expression (9) is satisfied:

$$D_{3a\_max}/D_{3L-max}<1.2 \quad (9)$$

where, $D_{3a\_max}$ denotes a maximum air space from among air spaces in the third lens unit, and $D_{3L-max}$ denotes a maximum lens thickness from among thickness of lenses in the third lens unit.

9. The zoom lens according to claim 1, wherein the second lens unit includes a lens which is disposed nearest to an object, and the following conditional expression (14) is satisfied:

$$0.5<(r_{2ff}+r_{2fb})/(r_{2ff}-r_{2fb})<1.7 \quad (14)$$

where, $r_{2ff}$ denotes a paraxial radius of curvature of an object-side lens surface of the lens disposed nearest to the object in the second lens unit, and $r_{2fb}$ denotes a paraxial radius of curvature of an image-side lens surface of the lens disposed nearest to the object in the second lens unit.

10. An image pickup apparatus comprising:
a zoom lens according to claim 1; and
an image pickup element having an image pickup surface.

11. A zoom lens comprising in order from an object side to an image side:
a first lens unit having a positive refractive power;
a second lens unit having a negative refractive power;
a third lens unit having a positive refractive power; and
a fourth lens unit having a negative refractive power, wherein
the fourth lens unit includes at least two lenses, and
at the time of zooming from a wide angle end to a telephoto end,
a distance between the first lens unit and the second lens unit widens,
a distance between the second lens unit and the third lens unit narrows, and
a distance between the third lens unit and the fourth lens unit fluctuates, and
the total number of lens units included in the zoom lens is four, and
the first lens unit, after moving toward the image side, moves toward the object side, wherein the following conditional expression (3) is satisfied:

$$3<\beta_{2t}/\beta_{3w}<7 \quad (3)$$

where, $\beta_{2t}$ denotes a magnification of the second lens unit at the telephoto end, and $\beta_{2w}$ denotes a magnification of the second lens unit at the wide angle end, and each of $\beta_{2t}$ and $\beta_{2w}$ is a magnification when focused at an infinite object point.

12. A zoom lens comprising in order from an object side to an image side:
a first lens unit having a positive refractive power;
a second lens unit having a negative refractive power;
a third lens unit having a positive refractive power; and
a fourth lens unit having a negative refractive power, wherein
the fourth lens unit includes at least two lenses, and
at the time of zooming from a wide angle end to a telephoto end,
a distance between the first lens unit and the second lens unit widens,
a distance between the second lens unit and the third lens unit narrows, and
a distance between the third lens unit and the fourth lens unit fluctuates, and
the total number of lens units included in the zoom lens is four, and
the first lens unit, after moving toward the image side, moves toward the object side, wherein the following conditional expression (4) is satisfied:

$$-1.9<\beta_{2t}<-0.75 \quad (4)$$

where, $\beta_{2t}$ denotes a magnification of the second lens unit at the telephoto end, and is a magnification when focused at an infinite object point.

13. A zoom lens comprising in order from an object side to an image side:
a first lens unit having a positive refractive power;
a second lens unit having a negative refractive power;
a third lens unit having a positive refractive power; and
a fourth lens unit having a negative refractive power, wherein
the fourth lens unit includes at least two lenses, and
at the time of zooming from a wide angle end to a telephoto end,
a distance between the first lens unit and the second lens unit widens,
a distance between the second lens unit and the third lens unit narrows, and
a distance between the third lens unit and the fourth lens unit fluctuates, and
the total number of lens units included in the zoom lens is four, and
the first lens unit, after moving toward the image side, moves toward the object side, wherein the following conditional expression (6) is satisfied:

$$0.3<f_1/f_t<1.0 \quad (6)$$

where, $f_1$ denotes a focal length of the first lens unit, and $f_t$ denotes a focal length of the overall zoom lens system at the telephoto end.

14. A zoom lens comprising in order from an object side to an image side:
a first lens unit having a positive refractive power;
a second lens unit having a negative refractive power;
a third lens unit having a positive refractive power; and
a fourth lens unit having a negative refractive power, wherein
the fourth lens unit includes at least two lenses, and
at the time of zooming from a wide angle end to a telephoto end,
a distance between the first lens unit and the second lens unit widens,
a distance between the second lens unit and the third lens unit narrows, and
a distance between the third lens unit and the fourth lens unit fluctuates, and the total number of lens units included in the zoom lens is four, and the first lens unit, after moving toward the image side, moves toward the object side, conditional expression (10) is satisfied:

$$D_{4a\_max}/D_{4L-sum} < 1.1 \tag{10}$$

where, $D_{4a\_max}$ denotes a maximum air space from among air spaces in the fourth lens unit, and $D_{4L-sum}$ denotes a sum of thickness of lenses in the fourth lens unit.

15. A zoom lens comprising in order from an object side to an image side:

a first lens unit having a positive refractive power;
a second lens unit having a negative refractive power;
a third lens unit having a positive refractive power; and
a fourth lens unit having a negative refractive power, wherein the fourth lens unit includes at least two lenses, and
at the time of zooming from a wide angle end to a telephoto end,
a distance between the first lens unit and the second lens unit widens,
a distance between the second lens unit and the third lens unit narrows, and
a distance between the third lens unit and the fourth lens unit fluctuates, and
the total number of lens units included in the zoom lens is four, and
the first lens unit, after moving toward the image side, moves toward the object side, wherein
the fourth lens unit includes a lens which is disposed nearest to an object, and a lens which is disposed nearest to an image, and
the following conditional expression (11) is satisfied:

$$0.01 < |(r_{4f}+r_{4b})|/|(r_{4f}-r_{4b})| < 4.35 \tag{11}$$

where, $r_{4f}$ denotes a paraxial radius of curvature of an object-side lens surface of the lens disposed nearest to the object, and $r_{4b}$ denotes a paraxial radius of curvature of an image-side lens surface of the lens disposed nearest to the image.

16. A zoom lens comprising in order from an object side to an image side:

a first lens unit having a positive refractive power;
a second lens unit having a negative refractive power;
a third lens unit having a positive refractive power; and
a fourth lens unit having a negative refractive power, wherein the fourth lens unit includes at least two lenses, and
at the time of zooming from a wide angle end to a telephoto end,
a distance between the first lens unit and the second lens unit widens,
a distance between the second lens unit and the third lens unit narrows, and
a distance between the third lens unit and the fourth lens unit fluctuates, and
the total number of lens units included in the zoom lens is four, and
the first lens unit, after moving toward the image side, moves toward the object side, wherein
the fourth lens unit includes a lens which is disposed nearest to an object, and
the following conditional expression (12) is satisfied:

$$0.4 < |(r_{4ff}+r_{4fb})|/|(r_{4ff}-r_{4fb})| < 2.2 \tag{12}$$

where, $r_{4ff}$ denotes a paraxial radius of curvature of an object-side lens surface of the lens disposed nearest to the object, and $r_{4b}$ denotes a paraxial radius of curvature of an image-side lens surface of the lens disposed nearest to the object.

17. A zoom lens comprising in order from an object side to an image side:

a first lens unit having a positive refractive power;
a second lens unit having a negative refractive power;
a third lens unit having a positive refractive power; and
a fourth lens unit having a negative refractive power, wherein the fourth lens unit includes at least two lenses, and
at the time of zooming from a wide angle end to a telephoto end,
a distance between the first lens unit and the second lens unit widens,
a distance between the second lens unit and the third lens unit narrows, and
a distance between the third lens unit and the fourth lens unit fluctuates, and
the total number of lens units included in the zoom lens is four, and
the first lens unit, after moving toward the image side, moves toward the object side, wherein
the fourth lens unit includes a lens which is disposed nearest to an image, and
the following conditional expression (13) is satisfied:

$$0.4 < |(r_{41f}+r_{41b})|/|(r_{41f}-r_{41b})| < 7 \tag{13}$$

where, $r_{41f}$ denotes a paraxial radius of curvature of an object-side lens surface of the lens disposed nearest to the image, and $r_{4b}$ denotes a paraxial radius of curvature of an image-side lens surface of the lens disposed nearest to the image.

18. A zoom lens comprising in order from an object side to an image side:

a first lens unit having a positive refractive power;
a second lens unit having a negative refractive power;
a third lens unit having a positive refractive power; and
a fourth lens unit having a negative refractive power, wherein the fourth lens unit includes at least two lenses, and
at the time of zooming from a wide angle end to a telephoto end,
a distance between the first lens unit and the second lens unit widens,
a distance between the second lens unit and the third lens unit narrows, and
a distance between the third lens unit and the fourth lens unit fluctuates, and
the total number of lens units included in the zoom lens is four, and
the first lens unit, after moving toward the image side, moves toward the object side, wherein
the fourth lens unit includes a lens which is disposed nearest to an image, and
a shape of an image-side lens surface of the lens disposed nearest to the image is a shape having a concave surface directed toward the image side.

19. A zoom lens comprising in order from an object side to an image side:

a first lens unit having a positive refractive power;
a second lens unit having a negative refractive power;

a third lens unit having a positive refractive power; and
a fourth lens unit having a negative refractive power, wherein
the fourth lens unit includes at least two lenses, and
at the time of zooming from a wide angle end to a telephoto end,
a distance between the first lens unit and the second lens unit widens,
a distance between the second lens unit and the third lens unit narrows, and
a distance between the third lens unit and the fourth lens unit fluctuates, and
the total number of lens units included in the zoom lens is four, and
the first lens unit, after moving toward the image side, moves toward the object side wherein
the second lens unit includes at least two lenses having a negative refractive power, and
the two lenses having a negative refractive power are disposed to be adjacent in order from the object side.

* * * * *